(12) United States Patent
Gillette

(10) Patent No.: US 11,073,850 B2
(45) Date of Patent: Jul. 27, 2021

(54) HVAC SELECTIVE ZONE SETPOINT SCHEDULING SYSTEMS AND METHODS

(71) Applicant: Johnson Controls Technology Company, Auburn Hills, MI (US)

(72) Inventor: Theresa N. Gillette, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/256,859

(22) Filed: Jan. 24, 2019

(65) Prior Publication Data

US 2020/0233440 A1   Jul. 23, 2020

Related U.S. Application Data

(60) Provisional application No. 62/794,015, filed on Jan. 18, 2019.

(51) Int. Cl.
| | |
|---|---|
| *G05D 23/19* | (2006.01) |
| *F24F 11/30* | (2018.01) |
| *F24F 11/523* | (2018.01) |
| *F24F 110/10* | (2018.01) |

(52) U.S. Cl.
CPC .......... *G05D 23/1934* (2013.01); *F24F 11/30* (2018.01); *F24F 11/523* (2018.01); *G05D 23/1923* (2013.01); *F24F 2110/10* (2018.01)

(58) Field of Classification Search
CPC ...... G05D 23/1934; F24F 11/30; F24F 11/523
See application file for complete search history.

(56) References Cited

U.S. PATENT DOCUMENTS

| | | | |
|---|---|---|---|
| 6,073,110 | A | 6/2000 | Rhodes et al. |
| 6,298,912 | B1 | 10/2001 | Rayburn et al. |
| 7,130,720 | B2 | 10/2006 | Fisher |
| 7,188,779 | B2 | 3/2007 | Alles |
| 7,809,472 | B1 | 10/2010 | Silva et al. |
| 7,832,465 | B2 | 11/2010 | Zou et al. |
| 8,108,076 | B2 | 1/2012 | Imes et al. |
| 8,190,273 | B1 | 5/2012 | Federspiel et al. |
| 8,374,725 | B1 | 2/2013 | Ols |
| 8,532,835 | B2 | 9/2013 | McLean |
| 8,660,708 | B2 | 2/2014 | Narayanamurthy et al. |
| 8,695,888 | B2 | 4/2014 | Kates |
| 8,880,226 | B2 | 11/2014 | Raman et al. |

(Continued)

FOREIGN PATENT DOCUMENTS

| | | |
|---|---|---|
| WO | 2011128416 A2 | 10/2011 |
| WO | 2016154686 A1 | 10/2016 |
| WO | 2018048432 A1 | 3/2018 |

*Primary Examiner* — Vincent H Tran
(74) *Attorney, Agent, or Firm* — Fletcher Yoder, P.C.

(57) ABSTRACT

The present disclosure describes techniques for improving configuration of a heating, ventilation, and air conditioning (HVAC) system. In some embodiments, a control system of a heating, ventilation, and air conditioning (HVAC) system includes control circuitry and memory. The memory stores instructions that, when executed by the control circuitry, causes the control circuitry to control air flow supplied to a first building zone by the HVAC system based on a temperature setpoint schedule associated with the first building zone; and control air flow supplied to a second building zone by the HVAC system based on a constant temperature setpoint associated with the second building zone.

21 Claims, 10 Drawing Sheets

(56) References Cited

U.S. PATENT DOCUMENTS

| | | |
|---|---|---|
| 9,122,285 B2 | 9/2015 | Mansfield et al. |
| 9,443,043 B1 | 9/2016 | Koop |
| 10,054,325 B2 | 8/2018 | Dyess |
| 10,095,207 B2 | 10/2018 | Ji et al. |
| 2008/0048046 A1 | 2/2008 | Wagner et al. |
| 2010/0070089 A1 | 3/2010 | Harrod et al. |
| 2010/0106333 A1* | 4/2010 | Grohman ............... G05B 15/00 700/278 |
| 2011/0257795 A1* | 10/2011 | Narayanamurthy .. F24F 5/0046 700/277 |
| 2013/0245838 A1* | 9/2013 | Zywicki ............. G05D 23/1905 700/278 |
| 2014/0156088 A1 | 6/2014 | Li et al. |
| 2015/0108230 A1 | 4/2015 | Cloonan et al. |
| 2015/0159893 A1 | 6/2015 | Daubman et al. |
| 2015/0167995 A1 | 6/2015 | Fadell et al. |
| 2015/0204569 A1* | 7/2015 | Lorenz .................. G05B 15/02 700/278 |
| 2016/0061469 A1 | 3/2016 | Albonesi et al. |
| 2016/0292781 A1 | 10/2016 | Nahmad et al. |
| 2016/0320078 A1 | 11/2016 | Milder et al. |
| 2017/0016643 A1* | 1/2017 | Combe .............. G05D 23/1904 |
| 2017/0177013 A1 | 6/2017 | Malhotra et al. |
| 2017/0198931 A9* | 7/2017 | Svendsen ................ F24F 11/62 |
| 2017/0205102 A1* | 7/2017 | Svendsen ................ F24F 11/30 |
| 2017/0307243 A1 | 10/2017 | Burt et al. |
| 2017/0370366 A1 | 12/2017 | Johnson et al. |
| 2018/0004178 A1 | 1/2018 | Haines et al. |
| 2018/0032043 A1* | 2/2018 | Matsuoka .............. G05B 15/02 |
| 2018/0038606 A1* | 2/2018 | Chakravarty ........... F24F 11/30 |
| 2018/0231271 A1* | 8/2018 | Najafi ................ F24F 13/1426 |
| 2018/0293038 A1 | 10/2018 | Meruva et al. |
| 2018/0320908 A1* | 11/2018 | Lorenz ............... G05B 19/0426 |
| 2019/0037024 A1* | 1/2019 | Mighdoll ........... G05D 23/1902 |
| 2019/0170375 A1* | 6/2019 | Poerschke ............. F24F 13/10 |
| 2019/0310667 A1* | 10/2019 | Brown ............... G06Q 30/0283 |
| 2020/0129796 A1* | 4/2020 | Bogart ..................... F24F 11/33 |

\* cited by examiner

HVAC SELECTIVE ZONE SETPOINT SCHEDULING SYSTEMS AND METHODS

CROSS-REFERENCE TO RELATED APPLICATION

This application is a Non-Provisional patent application claiming priority to and benefit of U.S. Provisional Patent Application No. 62/794,015, entitled "HVAC SELECTIVE ZONE SETPOINT SCHEDULING SYSTEMS AND METHODS," filed Jan. 18, 2019, which is herein incorporated by reference in its entirety for all purposes.

BACKGROUND

The present disclosure generally relates to heating, ventilation, and/or air conditioning (HVAC) systems and, more particularly, to configuring one or more air condition setpoints associated with a space serviced by an HVAC system.

This section is intended to introduce aspects of art that may be related to the techniques of the present disclosure, which are described and/or claimed below. This discussion is believed to be helpful in providing background information to facilitate a better understanding of the present disclosure. Accordingly, it should be understood that this section should be read in this light and not as an admission of prior art.

A heating, ventilation, and/or air conditioning (HVAC) system, is often deployed in a building to facilitate controlling air conditions, such as temperature and/or humidity, within the building. For example, an HVAC system may include equipment, such as an HVAC unit, which operates to produce temperature-controlled air, and/or an air damper, which operates to selectively restrict circulation of air, such as the temperature-controlled air and/or outside air, through internal spaces of the building. To facilitate controlling production and/or circulation of the temperature-controlled air, the HVAC system may include a control system that generally controls operation of its HVAC equipment.

Generally, a control system may control operation of HVAC equipment and, thus, circulation of air through an internal space of a building based at least in part on a target air condition, such as a temperature setpoint, associated with the internal space. Thus, to facilitate improving occupant comfort and/or operational efficiency, the control system may enable user configuration of the target air condition, for example, to account for occupancy of the building. However, at least in some instances, user configuration of target air conditions may be a relatively complex process. In fact, at least in some instances, the relative complexity may discourage user customization of the target air conditions and, thus, efficacy of the HVAC system, for example, at achieving a target occupant comfort level and/or a target power consumption.

BRIEF DESCRIPTION OF THE DRAWINGS

Various aspects of the present disclosure may be better understood upon reading the detailed description and upon reference to the drawings, in which.

SUMMARY

Figure 1:
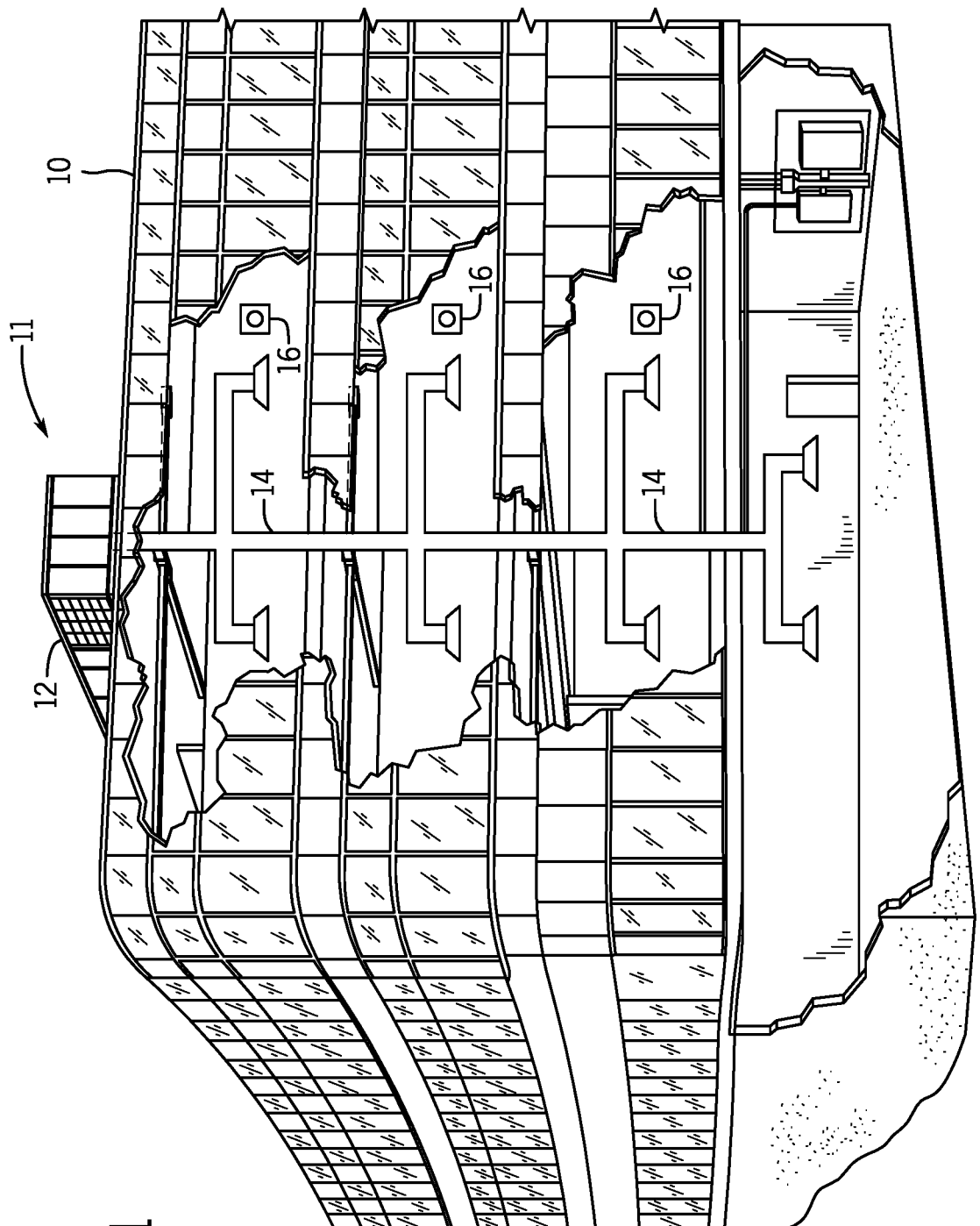
FIG. 1 is a partial cross-sectional view of a building that includes a heating, ventilation, and/or air conditioning (HVAC) system, in accordance with an embodiment of the present disclosure.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a control system of a heating, ventilation, and air conditioning (HVAC) system includes control circuitry and memory. The memory stores instructions that, when executed by the control circuitry, causes the control circuitry to control air flow supplied to a first building zone by the HVAC system based on a temperature setpoint schedule associated with the first building zone; and control air flow supplied to a second building zone by the HVAC system based on a constant temperature setpoint associated with the second building zone.

In another embodiment, a method of operating a heating, ventilation, and air conditioning (HVAC) system includes determining, using control circuitry, a constant air condition setpoint associated with a first building zone; determining, using the control circuitry, an air condition setpoint schedule associated with a second building zone, in which the air condition setpoint schedule includes one or more time periods each associated with a start time, a stop time, and an air condition setpoint; determining, using the control circuitry, a current air condition setpoint associated with the second building zone based on the air condition setpoint associated with a current time period of the air condition setpoint schedule; and controlling, using the control circuitry, air flow supplied to the first building zone and the second building zone during the current time period based on the constant air condition setpoint associated with the first building zone and the current air condition setpoint associated with the second building zone.

In another embodiment, a control system to be deployed in a heating, ventilation, and air conditioning (HVAC) system. The control system includes memory that stores a constant air condition setpoint associated with a building zone, an air condition setpoint schedule associated with the building zone, or both. Additionally, the control system includes control circuitry that determines a setpoint mode currently associated with the building zone; controls air flow supplied to the building zone based on the constant air condition setpoint when the setpoint mode currently associated with the building zone is a constant setpoint mode; and controls air flow supplied to the building zone based on the air condition setpoint schedule when the setpoint mode currently associated with the building zone is a scheduled setpoint mode.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a heating, ventilation, and/or air conditioning (HVAC) system, may operate to facilitate controlling air conditions, such as temperature and/or humidity, present within a building. To facilitate controlling air conditions, an HVAC system may include equipment that operates to produce temperature-controlled air, which may be circulated through internal spaces of a building. For example, equipment deployed in the HVAC system may include an HVAC unit that, during operation or while running, actuates a compressor motor to circulate refrigerant that extracts heat from input air, thereby producing cooled air, which may then be supplied to a serviced space. Additionally or alternatively, the HVAC equipment may include a furnace that, during operation or while running, combusts fuel to inject heat into input air, thereby producing heated air, which may then be supplied to the serviced space.

To facilitate improving control over air conditions, in some instances, an HVAC system may include equipment that operates to enable selectively adjusting air circulation through serviced spaces in a building. For example, equipment deployed in the HVAC system may include an air damper disposed in ductwork fluidly coupled between the HVAC unit and the serviced space. As such, supply of temperature-controlled air produced by the HVAC unit to the serviced space may be limited at least in part by damper position of the air damper. For example, the air damper may block air flow between the HVAC unit and the serviced space when in a fully closed position and enable air flow between the HVAC unit and the serviced space when in an at least partially open position. Additionally, the air damper may gradually reduce resistance against air flow between the HVAC unit and the serviced space as its damper position transitions or moves from the fully closed position toward a fully open position.

To control operation of its equipment, an HVAC system often includes a control system. Generally, a control system may control operation of HVAC equipment based at least in part on one or more target air conditions, such as a target temperature indicated via a temperature setpoint associated with a space conditioned or otherwise serviced by the HVAC equipment. For example, when temperature measured within a serviced space and a temperature setpoint associated with the serviced space differ by less than or equal to a difference threshold, a control system deployed in the HVAC system may instruct the HVAC system to turn off or maintain off the HVAC unit. On the other hand, when the temperature measured within the serviced space and the temperature setpoint differ by more than the difference threshold, the control system may instruct the HVAC system to turn on or run the HVAC unit, thereby producing temperature-controlled air, which may be supplied to the serviced space.

To facilitate improving control granularity over air conditions, in some instances, the serviced space within one or more buildings may be divided into multiple building zones, which may each be associated with one or more independently controllable target air conditions. For example, a first building zone may be associated with a first temperature setpoint while a second building zone may be associated with a second temperature setpoint, which may be relatively independently set (e.g., configured or programmed) or controlled relative to the first temperature setpoint. To facilitate achieving the independently controllable target air conditions, in some instances, HVAC equipment, such as a set of one or more air dampers, may be associated with each building zone.

For example, a first air damper associated with the first building zone may be disposed in ductwork coupled between the HVAC unit and the first building zone. Similarly, a second air damper associated with the second building zone may be disposed in ductwork fluidly coupled between the HVAC unit and the second building zone, and so on. As such, a control system may control supply of the temperature-controlled air produced by the HVAC unit to the first building zone at least in part by controlling damper position of the first air damper and the supply of the temperature-controlled air produced by the HVAC unit to the second building zone at least in part by controlling damper position of the second air damper.

To facilitate further improving control granularity over air conditions, in some instances, target air conditions for a building zone may be indicated via an air condition setpoint schedule. As used herein, an "air condition setpoint schedule" describes a finite control horizon, such as a day, a week, or a month, that includes one or more time periods each with a corresponding start time, stop time, and one or more air condition setpoints. For example, an air condition setpoint schedule with a control horizon of one day may associate a first temperature setpoint with a first time period, which starts at 12:00 AM and stops at 6:00 AM, a second temperature setpoint with a second time period, which starts at 6:00 AM and stops at 8:00 AM, a third temperature setpoint with a third time period, which starts at 9:00 AM and stops at 6:00 PM, a fourth temperature setpoint with a fourth time period, which starts at 6:00 PM and stops at 10:00 PM, and a fifth temperature setpoint with a fifth time period, which starts at 10:00 PM and stops at 12:00 AM. In other words, associating an air condition setpoint schedule with a building zone may enable air condition setpoints associated with different time periods during its control horizon to be relatively independently set and, thus, air conditions within the building zone to be controllably varied over the control horizon.

However, at least in some instances, programming or otherwise configuring an air condition setpoint schedule may be a relatively complex and/or time consuming process. For example, during initial setup configuration, a user, such as a homeowner or a service technician, may be prompted set a start time, a stop time, and one or more air condition setpoints for each of multiple time periods. In fact, due to the configuration complexity, forcing a user to program an air condition setpoint schedule for each of multiple building zones, at least in some instances, may increase likelihood of the user improperly configuring an air condition setpoint during initial setup configuration and/or reduce likelihood of the user subsequently correcting an improperly configured air condition setpoint. In other words, at least in some instances, forcing a user to program an air condition setpoint schedule for each of multiple building zones serviced by an HVAC system may affect (e.g., reduce) efficacy of the HVAC system, for example, at achieving a target occupant comfort level and/or a target power consumption.

Accordingly, to facilitate improving efficacy of HVAC systems, the present disclosure provides techniques for implementing and/or operating an HVAC system to enable selectively running an air condition setpoint schedule for each of multiple building zones serviced by the HVAC system, for example, during an initial configuration setup process and/or a subsequent configuration adjustment process. In particular, in some embodiments, the HVAC system may be implemented to support multiple different setpoint modes. For example, when a first (e.g., scheduled) setpoint mode is selected for a building zone, the building zone may be associated with an air condition setpoint schedule, which has a finite control horizon with one or more time periods each associated with one or more independently configurable target air conditions. On the other hand, when a second (e.g., constant) setpoint mode is selected for a building zone, the building zone may be associated with a constant air condition setpoint, for example, which has an infinite control horizon and, thus, no pre-defined start time or stop time.

In fact, in some embodiments, the HVAC system may be implemented to enable selecting different setpoint modes for different building zones serviced by the HVAC system. For example, the HVAC system may enable the first setpoint mode to be selected for a first building zone while the second setpoint mode is selected for a second building zone. In other words, as will be described in more detail below, the techniques described in the present disclosure may facilitate improving user customization of an HVAC system. At least in some instances, improving user customization may facilitate improving efficacy of an HVAC system, for example, by enabling a user, such as a homeowner or a service technician, to program air condition setpoint schedules only for a subset of building zones serviced by the HVAC system.

To facilitate user interaction, a control system may include one or more electronic displays and one or more input devices, such as a hard button and/or a touch sensor. For example, during an initial setup configuration process for a building zone, the electronic display may display a configuration setup graphical user interface (GUI), which prompts a user to select a setpoint mode for the building zone. In some embodiments, the second (e.g., constant) setpoint mode may be selected for the building zone when a user input received via the one or more input devices indicates a desire not to run an air condition setpoint schedule in the building zone. On the other hand, the first (e.g., scheduled) setpoint mode may be selected for the building zone when a user input received via the one or more input devices indicates a desire to run an air condition setpoint schedule in the building zone.

As described above, an air condition setpoint schedule may have a finite control horizon that includes one or more time periods each with a corresponding start time, stop time, and one or more air condition setpoints. As such, in some embodiments, when the first (e.g., scheduled) setpoint mode is selected for a building zone, the electronic display may display a setpoint schedule configuration graphical user interface (GUI), which prompts the user to indicate a start time for each of the one or more time periods, a stop time for each of the one or more time periods, and one or more air condition setpoints to be associated with each of the one or more time periods. On the other hand, when the second (e.g., constant) setpoint mode is selected for a building zone, the electronic display may display a constant setpoint configuration graphical user interface (GUI), which prompts the user to indicate a constant air condition setpoint to be associated with the building zone.

As such, programming or otherwise configuring of a constant air condition setpoint may generally be less complex than programming or otherwise configuring of an air condition setpoint schedule, for example, due at least in part to indication of start times and stop times requiring additional user inputs. In other words, at least in some instances, enabling a user to selectively run an air condition setpoint schedule for each of multiple building zones serviced by the HVAC system may facilitate reducing complexity of the initial setup configuration process, for example, due to the second (e.g., constant) setpoint mode being selected for one or more of the building zones and, thus, obviating configuration of air condition setpoint schedules for the one or more building zones. In this manner, the techniques described in the present disclosure may facilitate reducing complexity of an initial setup configuration process for an HVAC system, which, at least in some instances, may encourage user customization and, thus, improve likelihood of a user properly setting air condition setpoints, for example, to facilitate achieving a target occupant comfort level and/or a target power consumption.

Moreover, in some embodiments, the techniques described in the present disclosure may facilitate improving a configuration adjustment process, for example, performed after initial air condition setpoints are associated with the building zone via the initial setup configuration process. In particular, in some embodiments, the electronic display may display a zone configuration snapshot graphical user interface (GUI), which visually identifies one or more building zones and a corresponding setpoint mode currently selected for each of the one or more building zones. For example, the zone configuration snapshot graphical user interface may visually indicate that the first (e.g., scheduled) setpoint mode is currently selected for the first building zone and that the second (e.g., constant) setpoint mode is selected for the second building zone.

In some embodiments, a configuration adjustment process may be initiated by one or more user inputs received while the zone configuration snapshot graphical user interface is being displayed. In particular, in such embodiments, a user input that selects a visual representation of a building zone or its current setpoint mode may indicate a desire to change the current setpoint mode and/or an air condition setpoint associated with the building zone. In other words, in response to one or more user inputs received during display of the zone configuration snapshot graphical user interface, the control system may instruct an electronic display may display a setpoint configuration graphical user interface (GUI).

In fact, in some embodiments, a control system may adaptively control what setpoint configuration graphical user interface (GUI) is displayed based at least in part on where a user input is detected on the zone configuration snapshot graphical user interface. For example, a user input that selects a visual representation of the first building zone may indicate a desire to view and/or adjust an air condition setpoint schedule currently associated with the first building zone. Additionally or alternatively, a user input that selects a visual representation of a current setpoint mode of the second building zone may indicate a desire to toggle the current setpoint mode from the second (e.g., constant) setpoint mode to the first (e.g., scheduled) setpoint mode. In other words, in some embodiments, the control system may instruct the electronic display to display a setpoint schedule configuration graphical user interface (GUI) in response to a user input that selects a visual representation of a building zone currently in the scheduled setpoint mode or a visual representation of a constant setpoint mode currently associated with a building zone in the zone configuration snapshot graphical user interface.

On the other hand, a user input that selects a visual representation of the second building zone may indicate a desire to view and/or adjust a constant air condition setpoint currently associated with the second building zone. Additionally or alternatively, a user input that selects a visual representation of a current setpoint mode of the first building zone may indicate a desire to toggle the current setpoint mode from the first (e.g., scheduled) setpoint mode to the second (e.g., constant) setpoint mode. In other words, in some embodiments, the control system may instruct the electronic display to display a constant setpoint configuration graphical user interface (GUI) in response to a user input that selects a visual representation of a building zone currently in the scheduled setpoint mode or a visual representation of a constant setpoint mode currently associated with a building zone in the zone configuration snapshot graphical user interface. In this manner, the techniques described in the present disclosure may facilitate reducing complexity of a configuration adjustment process for an HVAC system, which, at least in some instances, may encourage user customization and, thus, improve likelihood of a user adjusting improperly configured air condition setpoints, for example, to facilitate achieve a target occupant comfort level and/or a target power consumption.

To help illustrate, a building 10 serviced by a heating, ventilating, and air conditioning (HVAC) system 11 is shown in FIG. 1. In some embodiments, the building 10 may be a commercial structure or a residential structure. Additionally, the HVAC system 11 may include equipment, such as one or more HVAC units 12 and/or one or more furnaces, that operates to produce temperature-controlled air, which may be supplied to internal spaces within the building via ductwork 14.

As described above, to facilitate controlling operation of the HVAC equipment, the HVAC system 11 may include a control system. In some embodiments, the control system may be implemented using one or more control devices 16, such as a thermostat control device, a zone control device (e.g., panel or module), and/or an equipment control device (e.g., controller). For example, a thermostat control device 16 may be used to designate target air conditions, such as a target temperature and/or a target humidity level, within the building 10 and/or measure air conditions present within the building 10.

To facilitate achieving target air conditions, the control system may control operation of the HVAC unit 12 and/or other HVAC equipment, such as one or more fans and/or one or more or air dampers disposed in the ductwork 14, based at least in part on the measured air conditions relative to the target air conditions. For example, when difference between a measured temperature and a target temperature is greater than a threshold, the control system may turn on or run the HVAC unit 12 to circulate refrigerant through one or more heat exchangers, which facilitates producing temperature-controlled air. Additionally, the control system may turn on a fan and/or adjust damper position of an air damper to facilitate supplying the temperature-controlled air to internal spaces within the building 10 via the ductwork 14.

To facilitate producing temperature-controlled air, in some embodiments, the HVAC unit 12 may be selectively operated in different operating modes, such as a first-stage cooling mode, a second-stage cooling mode, a fan only mode, a first-stage heating mode, and/or a second-stage heating mode. For example, when operating in a heating (e.g., heat pump) mode, the HVAC unit 12 may inject heat into input air, thereby producing heated air, which may then be supplied to internal spaces within the building 10. Additionally or alternatively, the HVAC system 11 may include a furnace that operates to produce the heated air. Furthermore, when operating in a cooling (e.g., air conditioning) mode, the HVAC unit 12 may extract heat from input air, thereby producing cooled air, which may then be supplied to internal spaces within the building 10.

In some embodiments, the HVAC system 11 may be a split HVAC system, for example, which includes an outdoor HVAC unit and an indoor HVAC unit. Additionally or alternatively, an HVAC unit 12 may be a single package unit that includes other equipment, such as a blower, a fan, an integrated air handler, and/or an auxiliary heating unit. For example, in the depicted embodiment, the HVAC unit 12 is a rooftop unit (RTU) that operates to condition a supply air stream, for example, which includes environmental air and/or a return air from the building 10.

Figure 2:
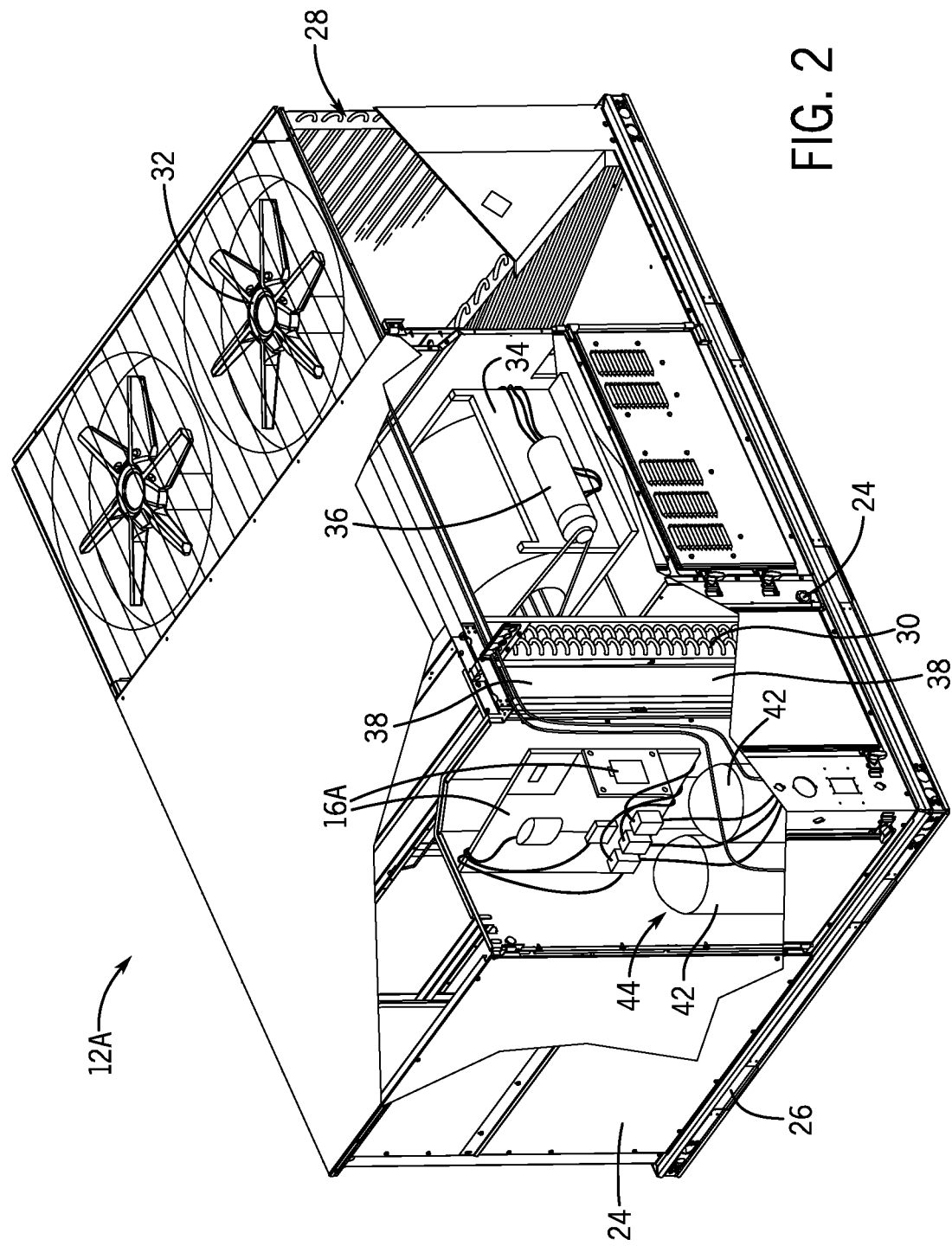
FIG. 2 is a partial cross-sectional view of an example of HVAC equipment that may be included in the HVAC system of FIG. 1, in accordance with an embodiment of the present disclosure.

To help illustrate, an example of a single package HVAC unit 12A is shown in FIG. 2. As depicted, the HVAC unit 12A includes a housing 24, a first heat exchanger 28, a second heat exchanger 30, one or more fans 32, a blower assembly 34, one or more air filters 38, a compressor 44, and an equipment control device 16A (e.g., controller). As described above, in some embodiments, a control system may include multiple control devices 16, such as one or more equipment control devices 16A. In other words, in such embodiments, the equipment control device 16A may communicate with one or more other control devices 16 implemented in the control system. For example, the equipment control device 16A may transmit (e.g., output) operational parameters, such as operational status, of the HVAC unit 12A to another control device 16. Additionally or alternatively, the equipment control device 16A may receive a data (e.g., control or command) signal transmitted from the other control device 16, which instructs the equipment control device 16 to adjust operation of the HVAC unit 12A.

As in the depicted example, the equipment control device 16A and/or other components of the HVAC unit 12A may be enclosed with the housing 24, for example, to protect to internal components from environmental contaminants and/or other contaminants. In some embodiments, the housing 24 may be constructed of galvanized steel and insulated with aluminum foil faced insulation. However, it should be appreciated that the depicted example is merely intended to be illustrative and not limiting. For example, in other embodiments, the equipment control device 16A may be implemented external to the housing 24 and/or separate from the HVAC unit 12A.

In any case, as in the depicted example, rails 26 may be joined to the bottom perimeter of the housing 24 to provide a foundation for the HVAC unit 12A. For example, the rails 26 may provide access for a forklift and/or overhead rigging to install and/or remove the HVAC unit 12A. Additionally, in some embodiments, the rails 26 may fit into "curbs," for example, implemented on the roof of the building 10, to enable the HVAC unit 12 to provide air to the ductwork 14 while blocking contaminants, such as rain, from leaking into the building 10.

As will be described in more detail below, the first heat exchanger 28 and the second heat exchanger 30 may be included in a refrigerant circuit (e.g., loop) that operates to circulate refrigerant, such as R-410A. In particular, the first heat exchanger 28 and the second heat exchanger 30 may each include tubing through which the refrigerant is circulated to facilitate heat exchange between the refrigerant and surrounding air. In some embodiments, the tubing may include multichannel tubing, copper tubing, aluminum tubing, and/or the like.

In other words, the first heat exchanger 28 and the second heat exchanger 30 may implement a thermal cycle in which the refrigerant undergoes phase changes and/or temperature changes as it flows through the first heat exchanger 28 and the second heat exchanger 30, thereby heating surrounding air and/or cooling surrounding air. For example, when operating in a cooling mode, the first heat exchanger 28 may function as a condenser to extract heat from the refrigerant and the second heat exchanger 30 may function as an evaporator to use the refrigerant to extract heat from the air to be supplied to internal spaces within the building 10. On the other hand, when operating in a heating mode, the first heat exchanger 28 may function as an evaporator to inject heat into the refrigerant and the second heat exchanger 30 may function as a condenser to inject heat from the refrigerant into the air to be supplied to internal spaces within the building 10.

To facilitate heat exchange, during operation, the fans 32 may draw environmental or outside air through the first heat exchanger 28. In this manner, the environmental air may be used to heat and/or cool as the refrigerant as it flows through the tubing of the first heat exchanger 28. Additionally, a blower assembly 34, powered by a motor 36, may draw air to be supplied to internal portions of the building 10 through the second heat exchanger 30. In some embodiments, the supply air may include environmental air, outside air, return air, inside air, or any combination thereof. In any case, in this manner, the refrigerant may be used to heat and/or cool the supply air as it flows through the tubing of the second heat exchanger 30.

In some embodiments, the HVAC unit 12A may flow supply air through one or more air filters 38, which operate to remove particulates and/or other air contaminants from the supply air. For example, one or more air filters 38 may be disposed on an air intake side of the second heat exchanger 30 to reduce likelihood of contaminants contacting tubing of the second heat exchanger 30. Additionally or alternatively, one or more air filters 38 may be disposed on an air output side of the HVAC unit 12A to reduce likelihood of contaminants being supplied to internal spaces within the building 10.

The HVAC unit 12 also may include other HVAC equipment, such as a compressor 44, a solid-core filter drier, a disconnect switch, an economizer, pressure switches, and/or the like. In some embodiments, the compressor 44 may be a scroll compressor, a rotary compressor, a screw compressor, or a reciprocating compressor. Additionally, in some embodiments, the compressor 44 may be implemented using multiple selectable compressor stages 42. For example, the compressor 44 may be implemented in a dual stage configuration with two compressor stages 42.

In this manner, an HVAC system 11 may be implemented with one or more single package HVAC units 12A. As described above, in other embodiments, an HVAC system 11 may be a split HVAC system. In such embodiments, instead of a single package HVAC unit 12A, the HVAC system 11 may be implemented with split HVAC units, such as an outdoor HVAC unit and an indoor HVAC unit.

Figure 3:
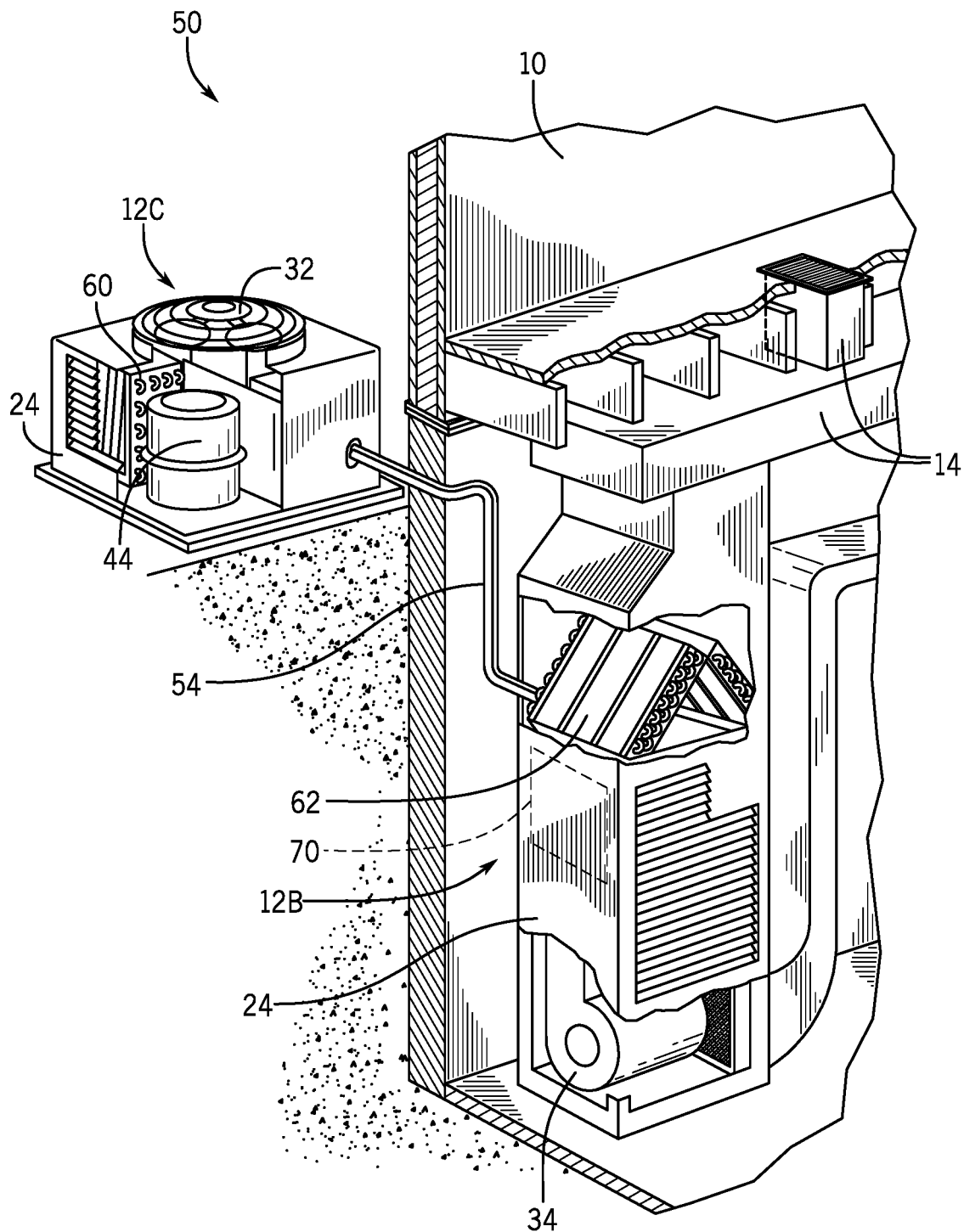
FIG. 3 is a partial cross-sectional view of another example of HVAC equipment that may be included in the HVAC system of FIG. 1, in accordance with an embodiment of the present disclosure.

To help illustrate, an example of a portion 50 of an HVAC system 11, which includes an indoor HVAC unit 12B and an outdoor HVAC unit 12C, is shown in FIG. 3. As depicted, the outdoor HVAC unit 12C may be implemented outside of the building 10, for example, adjacent a side of the building 10 and covered by a shroud to protect the system components from debris and/or other contaminants. On the other hand, the indoor HVAC unit 12B may be implemented inside the building 10, for example, in a utility room, an attic, a basement, or the like.

Additionally, as depicted, the outdoor HVAC unit 12C includes an outdoor heat exchanger 60 and a fan 32. In some embodiments, the outdoor heat exchanger 60 may be operated in a similar manner as the first heat exchanger 28 in the single package HVAC unit 12A. For example, the outdoor heat exchanger 60 may function as a condenser when in a cooling mode and as an evaporator when in a heating mode.

Furthermore, as depicted, the indoor HVAC unit 12B includes an indoor heat exchanger 62 and a blower assembly 66. In some embodiments, the indoor HVAC unit 12B may also include a furnace 70, for example, when HVAC system 11 is not implemented to operate in a heat pump mode. In such embodiments, the furnace 70 may combust fuel, such as natural gas, to produce a combustion product, which may be flowed through tubing of a separate indoor heat exchanger to facilitate injecting heat from the combustion product into supply air to be routed through ductwork 14 of the building 10.

Additionally or alternatively, in some embodiments, the indoor heat exchanger 62 may be operated in a similar manner as the second heat exchanger 30 in the single package HVAC unit 12A. For example, the indoor heat exchanger 62 may function as an evaporator when in a cooling mode and as a condenser when in a heating mode. Thus, as in the depicted example, the indoor HVAC unit 12B and the outdoor HVAC unit 12C may be fluidly coupled via one or more refrigerant conduits 54 to form a refrigerant circuit (e.g., loop), for example, typically transferring primarily liquid refrigerant in one direction and primarily vaporized refrigerant in the opposite direction.

Figure 4:
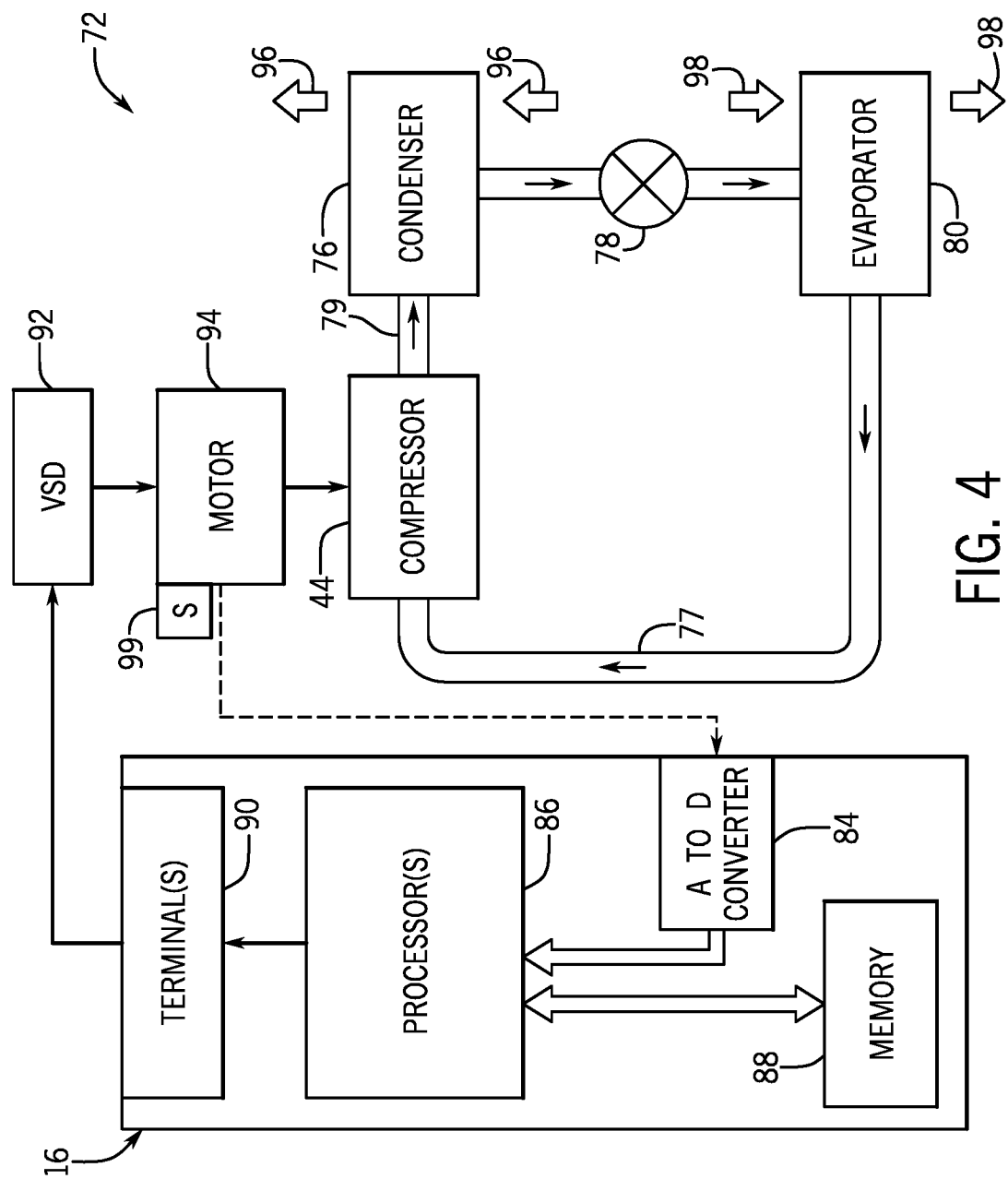
FIG. 4 is a block diagram of a refrigerant loop that may be implemented in the HVAC system of FIG. 1, in accordance with an embodiment of the present disclosure.

To help illustrate, an example of a refrigerant circuit 72 is shown in FIG. 4. As depicted, the refrigerant circuit 72 includes a compressor 44, a condenser 76, one or more expansion devices 78 or valves, and an evaporator 80. As described above, in some embodiments, the condenser 76 and/or the evaporator 80 may each be implemented using one or more heat exchangers. In any case, actuation of the compressor 44 generally drives circulation of refrigerant through the refrigerant circuit 72. In particular, the compressor 44 may receive refrigerant vapor from the evaporator 80 via a suction line 77, compress the refrigerant vapor, and output the compressed refrigerant vapor to the condenser 76 via a discharge line 79.

As the refrigerant flows through the condenser 76, a first air flow 96 may be used to extract heat from refrigerant to facilitate condensing the vapor into liquid. When operating in a cooling mode, the first air flow 96 may be produced using environmental or outside air, for example, by actuating a fan 32. On the other hand, when operating in a heating mode, the first air flow 96 may be produced using supply air, for example, by actuating a blower assembly 34. Before being supplied to the evaporator 80, the refrigerant may flow through one or more expansion devices 78 to facilitate reducing pressure.

As the refrigerant flows through the evaporator 80, the refrigerant may undergo a phase change from liquid to vapor that facilitates extracting heat from a second air flow 98. When operating in a cooling mode, the second air flow 98 may be produced using supply air, for example, by actuating a blower assembly 34. On the other hand, when operating in a heating mode, the second air flow 98 may be produced using environmental or outside air, for example, by actuating a fan 32. Thereafter, the refrigerant may be circulated back to the compressor 44.

As depicted, the compressor 44 may be actuated by a compressor motor 94 during operation. In some embodiments, the compressor motor 94 may be a switched reluctance motor, an induction motor, an electronically commutated permanent magnet motor, and/or another suitable electromechanical motor. In other words, the compressor motor 94 may actuate the compressor 44 when electrical power is supplied to the compressor motor 94.

To facilitate controlling supply of electrical power to the compressor motor 94, a variable speed drive (VSD) 92 may be coupled to the compressor motor 94. In particular, the variable speed drive 92 may receive alternating current (AC) electrical power having a fixed line voltage and a fixed line frequency from a power source, such as an electrical grid. Additionally, a control device 16 may control operation of the variable speed drive 92 to supply alternating current (AC) electrical power with a variable voltage and/or a variable frequency to the compressor motor 94, for example, by controlling switching devices implemented in the variable speed drive 92. In other embodiments, the compressor motor 94 may be powered directly from an AC power source or a direct current (DC) power source, such as a battery.

To facilitate controlling operation of the variable speed drive 92, as in the depicted example, the control device 16 may include an analog to digital (A/D) converter 84, one or more processors 86, memory 88, and one or more terminals 90, which may be used to couple the control device 16 to the variable speed drive 92, one or more sensors 99, and/or another control device 16. For example, to control switching in the variable speed drive 92, a processor 86 implemented in the control device 16 may execute instructions stored in a tangible, non-transistor, computer readable medium, such as the memory 88, to determine control and/or command signals, which may be communicated to the variable speed drive 92 via a terminal 90. Additionally, in some embodiments, the control device 16 may control switching in the variable speed drive 92 based at least in part on feedback from the compressor motor 94 and/or other sensors 99, for example, which may be received as analog electrical signals via a terminal 90 and converted to digital data via the analog to digital (A/D) converter 84 before processing and/or analysis by one or more processors 86.

Figure 5:
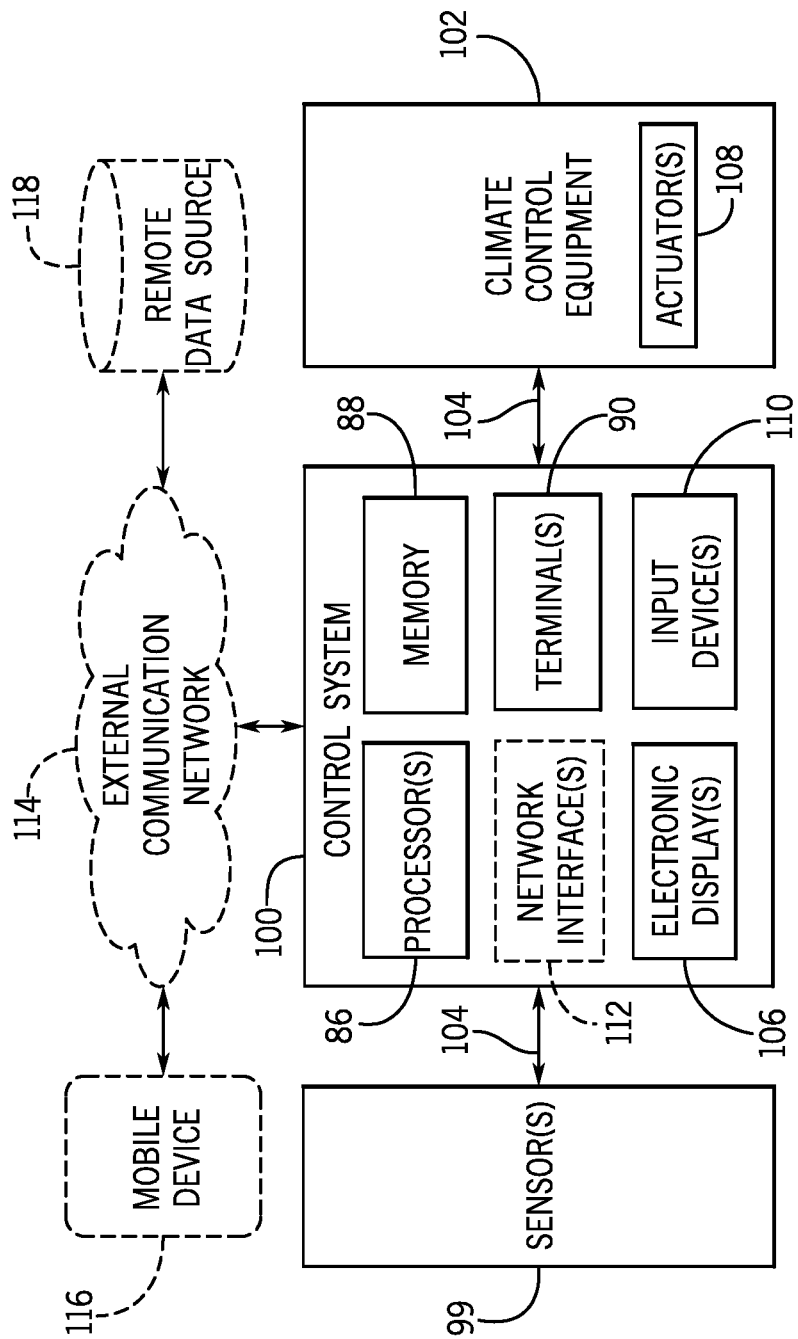
FIG. 5 is a block diagram of a portion of the HVAC of FIG. 1 that includes a control system, one or more sensors, and HVAC equipment, in accordance with an embodiment of the present disclosure.

In any case, as described above, an HVAC system, such as an HVAC system 11, may include a control system that controls operation of HVAC equipment deployed therein to facilitate controlling air conditions, such as temperature and/or humidity level, present within a building 10 serviced by the HVAC system 11. To help illustrate, an example of a control system 100, which may be deployed in an HVAC system 11, is shown in FIG. 5. As will be described in more detail below, in some embodiments, the control system 100 may be implemented using one or more control devices 16, such as thermostat control devices, zone control devices, and/or equipment control devices 16A.

In any case, as in the depicted example, the control system 100 may include one or more processors 86 and memory 88, for example, deployed in one or more control devices 16 of the control system 100. Generally, during operation of the control system 100, the one or more processors 86 may execute instructions stored in the memory 88, for example, to determine a control action to be implemented by one or more actuators 108, such as a compressor motor 94, in the HVAC equipment 102 based at least in part on measured air conditions relative to target air conditions. Thus, in some embodiments, the one or more processors 86 may include processing circuitry, for example, implemented in one or more general purpose microprocessors, one or more application specific processors (ASICs), one or more field programmable logic arrays (FPGAs), or any combination thereof.

In addition to executable instructions, in some embodiments, the memory 88 may store data to be processed and/or analyzed by the one or more processors 86. For example, the memory 88 may store an air condition setpoint associated with a serviced space, an air condition setpoint schedule associated with the serviced space, and/or a setpoint mode indicator that indicates a setpoint mode for the serviced space. Thus, in some embodiments, the memory 88 may include one or more tangible, non-transitory, computer-readable media. For example, the memory 88 may include one or more random access memory (RAM) devices, one or more read only memory (ROM) devices, one or more flash memory devices, one or more hard disk drives, one or more optical discs, or any combination thereof.

Additionally, as in the depicted example, the control system 100 may include one or more terminals 90, for example, implemented on one or more control devices 16 of the control system 100. In some embodiments, the terminals 90 may be used to couple the control system 100 to one or more sensors 99 and/or to HVAC equipment 102, for example, by connecting a first wire between a first terminal 90 of the control system 100 and a sensor 99 and/or connecting a second wire between a second terminal 90 of the control system 100 and HVAC equipment 102 to form one or more internal communication networks 104. Additionally or alternatively, control devices 16 implemented in the control system 100 may communicate with one another via one or more internal communication networks 104, for example, formed at least in part by connecting a wire between a terminal 90 of a first control device 16, such as a thermostat control device 16, and a terminal of a second control device 16, such as a zone control device 16 or an equipment control device 16A.

To facilitate user interaction, as in the depicted example, the control system 100 may include one or more electronic displays 106 and one or more input devices 110. In particular, as will be described in more detail below, the control system 100 may instruct an electronic display 106 to display one or more graphical user interfaces (GUIs) that provide visual representations of information related to the HVAC system. For example, the electronic display 106 may display a graphical user interface (GUI) that provides a visual representation of a temperature setpoint schedule to be used to control air temperature in a serviced space. Thus, in some embodiments, an electronic display 106 may include a liquid crystal display (LCD), an organic light-emitting diode (OLED) electronic display, and/or the like.

Additionally, the control system 100 may receive instructions from a user, such as a homeowner or a service technician, via user inputs detected by its one or more inputs devices 110. For example, while the visual representation of the temperature setpoint schedule is being displayed, an input device 110 may receive a user input that requests a change in the value of a temperature setpoint included in the temperature setpoint schedule. Thus, in some embodiments, an input device 110 may include a hard button, a switch, a touch sensor disposed on or integrated with an electronic display 106, and/or the like.

Moreover, in some embodiments, the control system 100 may include one or more network interfaces 112, which may be used to communicatively couple the control system 100 to an external communication network 114. For example, a network interface 112 may connect the control system 100 to a personal area network (PAN), such as a Bluetooth network, a local area network (LAN), such as an 802.11x Wi-Fi network, and/or a wide area network (WAN), such as a cellular network. In other words, in some embodiments, a network interface 112 may enable the control system 100 to communicate with a mobile device 116 and/or a remote data source 118, such as a weather database and/or a utility provider server, connected to the external communication network 114.

However, it should be appreciated that the depicted example is merely intended to be illustrative and not limiting. In particular, in some embodiments, one or more of the depicted components may be optional and, thus, not included in the control system 100. For example, in other embodiments, a control system 100 may be designed to only communicate via internal communication networks 104 and, thus, not include a network interface 112. Additionally or alternatively, the control system 100 may include one or more components other than the depicted components. For example, in some embodiments, the control system 100 may additionally include one or more analog-to-digital converters 84. In any case, as described above, in some embodiments, a control system 100 may be implemented using multiple control devices 16.

Figure 6:
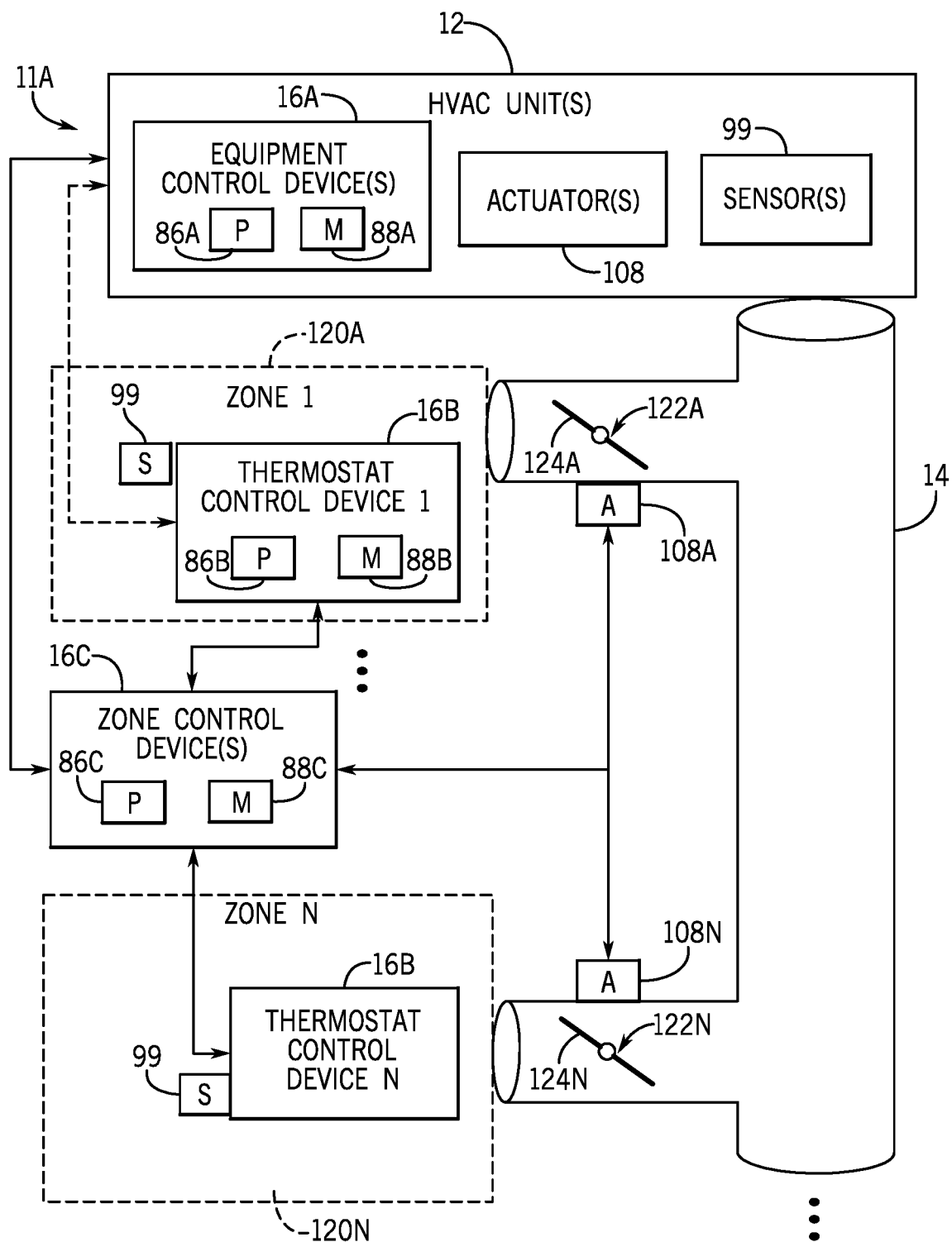
FIG. 6 is a block diagram of an example of the control system of FIG. 5 implemented as a zone control system deployed across multiple building zones, in accordance with an embodiment of the present disclosure.

To help illustrate, an example of a zoned HVAC system 11A, which includes a control system 100 implemented using multiple control devices 16, is shown in FIG. 6. As described above, to facilitate improving air condition control granularity, a space serviced by an HVAC system 11 may be divided into multiple building zones 120, which may each be associated with one or more independently controllable target air conditions. For example, the serviced space may be divided into a first building zone 120A and an Nth building zone 120N.

To facilitate controlling air conditions within building zones 120, in some embodiments, the control system 100 may include one or more thermostat control devices 16B, for example, each corresponding with and/or deployed in a different building zone 120. In other words, as in the depicted example, the control system 100 may include a first thermostat control device 16B corresponding with the first building zone 120A and an Nth thermostat control device 16B corresponding with the Nth building zone 120N. In some embodiments, a thermostat control device 16B may determine one or more air conditions measured by one or more sensors 99 in a corresponding building zone 120. Based at least in part on the measured air conditions, the thermostat control device 16B may output a call signal that requests conditioning (e.g., cooling, heating, and/or ventilation) of the corresponding building zone 120, for example, when a measured air temperature deviates from a temperature setpoint by more than a difference threshold.

In addition to thermostat control devices 16B, as described above, a control system 100 may include one or more equipment control devices 16A (e.g., controller) implemented to control operation of HVAC equipment 102, such as an HVAC unit 12. Thus, as in the depicted example, an equipment control device 16A may be deployed in an HVAC unit 12 along with one or more actuators 108, such as a compressor motor 94, and/or one or more sensors 99, such as a leaving air temperature sensor 99. In some embodiments, HVAC equipment 102 deployed in the zoned HVAC system 11A may additionally include one or more damper assemblies 122 each with a damper actuator 108, such as a damper motor, and one or more damper blades 124, such as a damper plate.

To facilitate achieving independently controllable target air conditions, as in the depicted example, a set of one or more damper assemblies 122 may be fluidly coupled between the HVAC unit 12 and each of the multiple building zones 120. For example, a first set including a first damper assembly 122A may be disposed in ductwork 14 fluidly coupled between the HVAC unit 12 and the first building zone 120A. Additionally, an Nth set including an Nth damper assembly 122N may be disposed in ductwork 14 fluidly coupled between the HVAC unit 12 and the Nth building zone 120N. As such, air flow from the HVAC unit 12 to the first building zone 120A may be controlled at least in part by controlling damper position of a first damper blade 124A in the first damper assembly 122A while air flow from the HVAC unit 12 to the Nth building zone 120N may be controlled at least in part by controlling damper position of an Nth damper blade 124N in the Nth damper assembly 122N.

To facilitate controlling damper position, as described above, a control system 100 may include one or more zone control devices 16C, such as a zone control panel or a zone control module. To control damper position of a damper assembly 122, in some embodiments, a zone control device 16C may be coupled to its damper actuator 108, for example, to enable the zone control device 16C to output a close signal that causes the damper actuator 108 to transition a damper blade 124 coupled thereto to a more closed position and/or an open signal that causes the damper actuator 108 to transition the damper blade 124 to a more open position. In other words, as in the depicted example, the zone control device 16C may be communicatively coupled to a first damper actuator 108A of the first damper assembly 122A to enable the zone control device 16C to control damper position of the first damper assembly 122A and, thus, air flow from the HVAC unit 12 to the first building zone 120A. Similarly, the zone control device 16C may be coupled to an Nth damper actuator 108N of the Nth damper assembly 122A to enable the zone control device 16C to control damper position of the Nth damper assembly 122N and, thus, air flow from the HVAC unit 12 to the Nth building zone 120N.

However, it should be appreciated that the depicted example is merely intended to be illustrative and not limiting. In particular, in other embodiments, a control system 100 may include more than four control devices 16 or fewer than four control devices 16. Moreover, in some embodiments, a control system 100 may include multiple instances of the same type of control device 16. For example, in some embodiments, a zone control device 16C, such as a zone control panel or a zone control module, may be implemented with a finite number of terminals 90 and, thus, may be wired to a finite number of thermostat control devices 16B and/or a finite number of damper assemblies 122, thereby limiting the number of building zones 120. To facilitate increasing the number of building zones 120, in such embodiments, a control system 100 may include multiple zone control devices 16, for example, with a primary zone control device 16C controlling air flow from the HVAC unit 12 to the first building zone 120A and to the Nth building zone 120N while a secondary (e.g., adder) zone control device 16C controls air flow from the HVAC unit 12 to an N+1th building zone 120 and a 2Nth building zone 120. Furthermore, in some embodiments, the zoned HVAC system 11A may include multiple HVAC units 12, for example, including one or more single package (e.g., rooftop) HVAC units 12A, one or more indoor HVAC units 12B, and/or one or more outdoor HVAC units 12C.

In any case, as described above, in some embodiments, a control device 16 deployed in the control system 100 may include one or more processors 86 and memory 88. For example, the equipment control device 16A may include a first one or more processors 86A and first memory 88A. Additionally, a thermostat control device 16B may include a second one or more processors 86B and second memory 88B. Furthermore, the zone control device 16C may include a third one or more processors 86C and third memory 88C.

Moreover, as described above, in some embodiments, memory 88 may store instructions executable by the one or more processors 86. For example, the second one or more processors 86B implemented in a thermostat control device 16B may execute instructions stored in the second memory 88B to determine air conditions measured by one or more sensors 99 and/or to output a call signal that requests conditioning (e.g., heating, cooling, and/or ventilation) of a corresponding building zone 120 when the measured value deviates from a corresponding air condition setpoint by more than a difference threshold. Additionally, the third one or more processors 86C implemented in the zone control device 16C may execute instructions stored in the third memory 88C, for example, to convert between different communication protocols and/or to control operational parameters, such as damper position, of one or more damper assemblies 122 based at least in part on conditioning call signals received from one or more thermostat control devices 16B deployed in the zoned HVAC system 11A. Furthermore, the first one or more processors 86A implemented in the equipment control device 16A may execute instructions stored in the first memory 88A, for example, to control operational parameters, such as actuation speed, of one or more actuators 108 in the HVAC unit 12 and/or to determine operational parameters, such as leaving air temperature, measured by one or more sensors 99 in the HVAC unit 12.

In addition to executable instructions, as described above, memory 88 may store data to be processed, analyzed, and/or otherwise used by a control system 100. In fact, in some embodiments, memory addresses in the memory 88 may be allocated or otherwise dedicated to storing parameter data associated with specific building zones 120. For example, a first one or more memory addresses may be allocated for indicating parameters associated with the first building zone 120A, such a setpoint mode of the first building zone 120A, one or more air condition setpoints associated with the first building zone 120A, and/or a start time and a stop time for one or more time periods during a control horizon when the schedule setpoint mode is selected for the first building zone 120A. Similarly, an Nth one or more memory addresses may be allocated for indicating parameters associated with the Nth building zone 120N, such a setpoint mode of the Nth building zone 120N, one or more air condition setpoints associated with the Nth building zone 120N, and/or a start time and a stop time for one or more time periods during a control horizon when the schedule setpoint mode is selected for the Nth building zone 120N.

In other words, in some embodiments, parameters associated with a building zone 120 may include a setpoint mode indicator that identifies a setpoint mode of the building zone 120. As an illustrative example, the setpoint mode indicator may be "1-bit" when the scheduled setpoint mode is selected for a building zone and a "0-bit" when the constant setpoint mode is selected for the building zone 120. In any case, as described above, values of one or more parameters associated with a building zone 120 may be configured (e.g., set and/or adjusted) during a configuration process, such as an initial setup configuration process and/or a subsequent configuration adjustment process.

Figure 7:
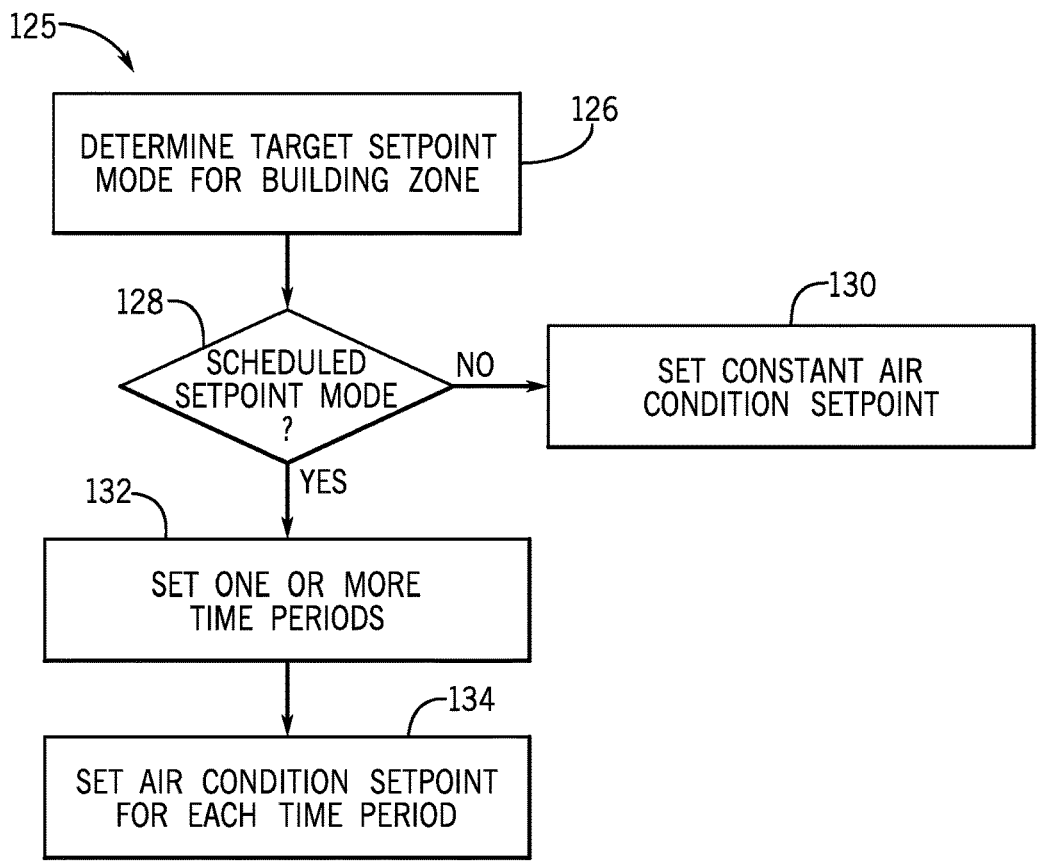
FIG. 7 is a flow diagram of an example process for configuring one or more target air conditions to be associated with a building zone, in accordance with an embodiment of the present disclosure.

To help illustrate, an example of a configuration process 125 is described in FIG. 7. Generally, the configuration process 125 includes determining a target setpoint mode for a building zone (process block 126), determining whether the target setpoint mode is a scheduled setpoint mode (decision block 128), and setting a constant air condition setpoint when the target setpoint mode is not the scheduled setpoint mode (process block 130). Additionally, when the target setpoint mode is the scheduled setpoint mode, the configuration process 125 includes setting one or more time periods (process block 132) and setting an air condition setpoint for each of the one or more time periods (process block 134).

Although described in a particular order, which represents a particular embodiment, it should be noted that the process 125 may be performed in any suitable order. Additionally, embodiments of the process 125 may omit process blocks and/or include additional process blocks. Moreover, in some embodiments, the process 125 may be implemented at least in part by executing instructions stored in a tangible, non-transitory, computer-readable medium, such as memory 88 implemented in a control system 100, using processing circuitry, such as a processor 86 implemented in the control system 100.

Accordingly, in some embodiments, a control system 100 deployed in a zoned HVAC system 11A may determine a target setpoint mode to be used to specify one or more air condition setpoints associated with a building zone 120 (process block 126). As described above, in some embodiments, a control system 100 may determine the target setpoint mode based on one or more user inputs received from a user, such as a homeowner or a service technician. To facilitate user interaction, as described above, the control system 100 may include one or more electronic displays 106 and one or more input devices 110, such as a hard button and/or a touch sensor. Additionally, as described above, the control system 100 may facilitate user selection of a target setpoint mode for a building zone 120 during an initial setup configuration process and/or a subsequent configuration adjustment process at least in part by displaying one or more graphical user interfaces (GUIs) on an electronic display 106.

Figure 8:
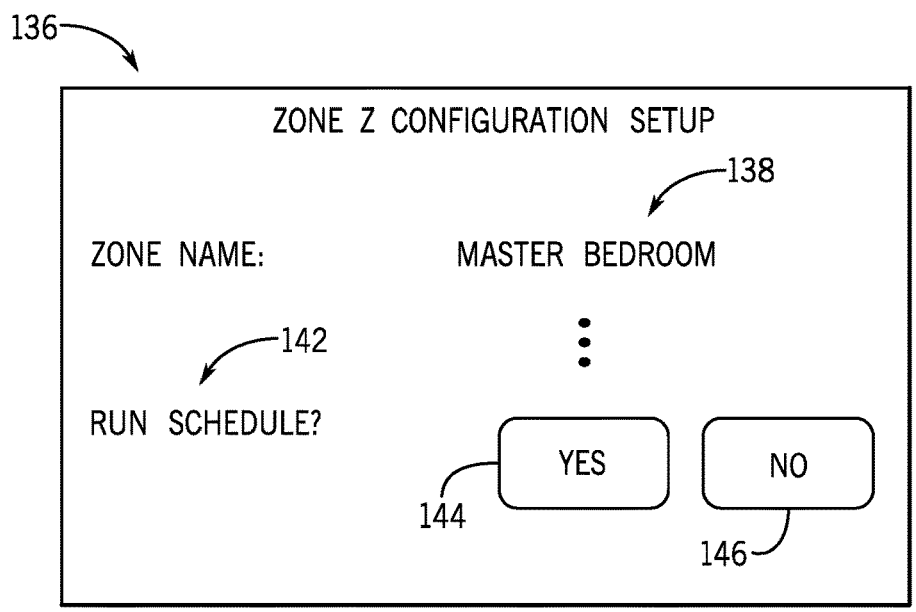
FIG. 8 is an example of a zone configuration setup graphical user interface (GUI) including a prompt to select a setpoint mode to be used to indicate one or more air condition setpoints associated with a building zone, in accordance with an embodiment of the present disclosure.

To help illustrate, an example of a configuration setup graphical user interface (GUI) 136, which may be displayed on an electronic display 106 during an initial setup configuration process, is shown in FIG. 8. In particular, the depicted configuration setup graphical user interface 136 corresponds with a Zth building zone 120. In other words, a control system 100 may instruct the electronic display 106 to display the configuration setup graphical user interface 136 during initial setup configuration of the Zth building zone 120.

As in the depicted example, a configuration setup graphical user interface 136 may provide a visual representation of one or more parameters associated with a corresponding building zone 120. For example, the configuration setup graphical user interface 136 may include a visual representation 138 of a zone name parameter associated with the Zth building zone 120. In some embodiments, when not previously set by a user (e.g., during initial setup configuration process), the zone name parameter may be a default value, for example, pre-determined and stored in memory 88 of a thermostat control device 16B by a manufacturer, a system integrator, or a service technician. Additionally or alternatively, the visual representation 138 of the zone name parameter may be blank upon initial display of the configuration setup graphical user interface 136, thereby prompting a user, such as a service technician or a homeowner, to set the zone name parameter of the Zth building zone 120.

In some embodiments, a control system 100 may enable a user, such as a homeowner or a service technician, to set and/or adjust a value of one or more parameters associated with a building zone 120 from a corresponding configuration setup graphical user interface 136. For example, in response to a user input selecting the visual representation 138 of the zone name parameter, the control system 100 may set the zone name parameter of the Zth building zone 120 based at least in part on subsequently received user inputs. In some embodiments, the control system 100 may enable user inputs to select a parameter value from multiple pre-determined options. Additionally or alternatively, the control system 100 may enable user inputs to explicitly indicate the parameter value. In fact, to facilitate improving user configuration, the configuration setup graphical user interface (GUI) 136 may adaptively adjust the visual representation of a parameter, such as the visual representation 138 of the zone name parameter, in response to a user input that requests a change to the value of the parameter.

Furthermore, as in the depicted example, a configuration setup graphical user interface 136 may include a visual representation 142 of a prompt requesting user selection of a setpoint mode for the Zth building zone 120. To facilitate setpoint mode selection, as in the depicted example, the configuration setup graphical user interface 136 may include a YES soft button 144 and a NO soft button 146. In some embodiments, functionality of a soft button, such as the YES soft button 144 or the NO soft button 146, may additionally or alternatively be implemented via a hard button input device 110. In this manner, a configuration setup graphical user interface 136 may facilitate user indication of a target setpoint mode for a corresponding building zone 120 during an initial setup configuration process.

In other words, returning to the process 125 of FIG. 7, during initial setup configuration of a building zone 120, the control system 100 may determine whether the target setpoint mode for the building zone 120 is a scheduled setpoint mode based on one or more user inputs received while a corresponding configuration setup graphical user interface 136 is being displayed (decision block 128). For example, with reference to the configuration setup graphical user interface 136 of FIG. 8, the control system 100 may determine that the target setpoint mode of the Zth building zone 120 is the scheduled setpoint mode when a user input selecting the YES soft button 144 is received. On the other hand, the control system 100 may determine that the target setpoint mode for the Zth building zone 120 is the constant setpoint mode and, thus, not the schedule setpoint mode when a user input selecting the NO soft button 146 is received.

As will be described in more detail below, in some embodiments, an electronic display 106 may display a zone configuration snapshot graphical user interface (GUI) that enables a user to change the setpoint mode associated with one or more building zones 120, for example, after completion of the initial setup configuration process. In particular, the zone configuration snapshot graphical user interface may include a visual representation of a current setpoint mode associated with each building zone 120. Additionally, in some embodiments, the zone configuration snapshot graphical user interface may enable a user to change the setpoint mode associated with a building zone by selecting the visual representation of its current setpoint mode.

In other words, when a user input selects a visual representation of a current setpoint mode from a zone configuration snapshot graphical user interface, the control system 100 may determine whether the target setpoint mode for a corresponding building zone 120 is a scheduled setpoint mode based on the setpoint mode currently associated with the building zone 120 (decision block 128). For example, when a user input selects a visual representation of a constant setpoint mode, the control system 100 may determine that the target setpoint mode of a corresponding building zone 120 is the scheduled setpoint mode. On the other hand, when a user input selects a visual representation of a scheduled setpoint mode, the control system 100 may determine that the target setpoint mode of a corresponding building zone 120 is the constant setpoint mode and, thus, not the schedule setpoint mode.

In any case, when the target setpoint mode is not the schedule setpoint mode, the control system 100 may enable a user to set and/or adjust a constant air condition setpoint to be associated with the building zone 120 (process block 130). On the other hand, when the target setpoint mode is the schedule setpoint mode, the control system 100 may enable a user to set and/or adjust an air condition setpoint schedule to be associated with the building zone 120. In other words, when the target setpoint mode is the schedule setpoint mode, the control system 100 may enable a user to set and/or adjust one or more time periods during a control horizon of the air condition setpoint schedule (process block 132) and to set and/or adjust one or more air condition setpoints associated with the one or more time periods (process block 134).

To facilitate user configuration of air condition setpoints, in some embodiments, a control system 100 may display one or more setpoint configuration graphical user interfaces (GUIs). For example, when the target setpoint mode is the constant setpoint mode, the control system 100 may display a constant setpoint configuration graphical user interface (GUI) that enables a user to set and/or adjust a constant air condition setpoint to be associated with the building zone 120. On the other hand, when the target setpoint mode is the scheduled setpoint mode, the control system 100 may display a setpoint schedule configuration graphical user interface (GUI) that enables a user to set and/or adjust one or more time periods during a control horizon and to set and/or adjust one or more air condition setpoints to be associated with the one or more time periods.

Figure 9:
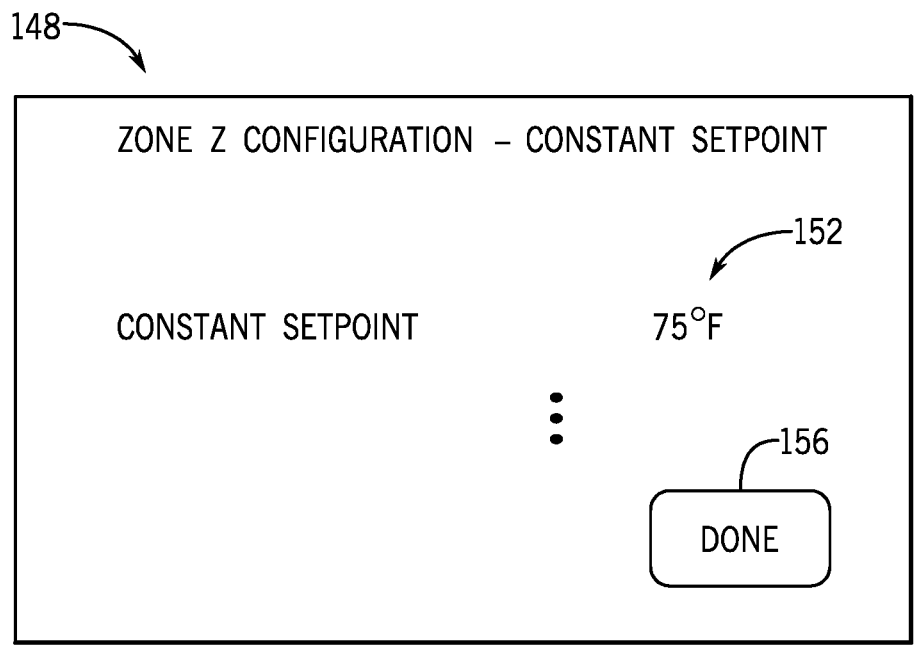
FIG. 9 is an example of a constant setpoint configuration graphical user interface (GUI) including a prompt to enter or select a constant air condition setpoint to be associated with a building zone, in accordance with an embodiment of the present disclosure.
Figure 10:
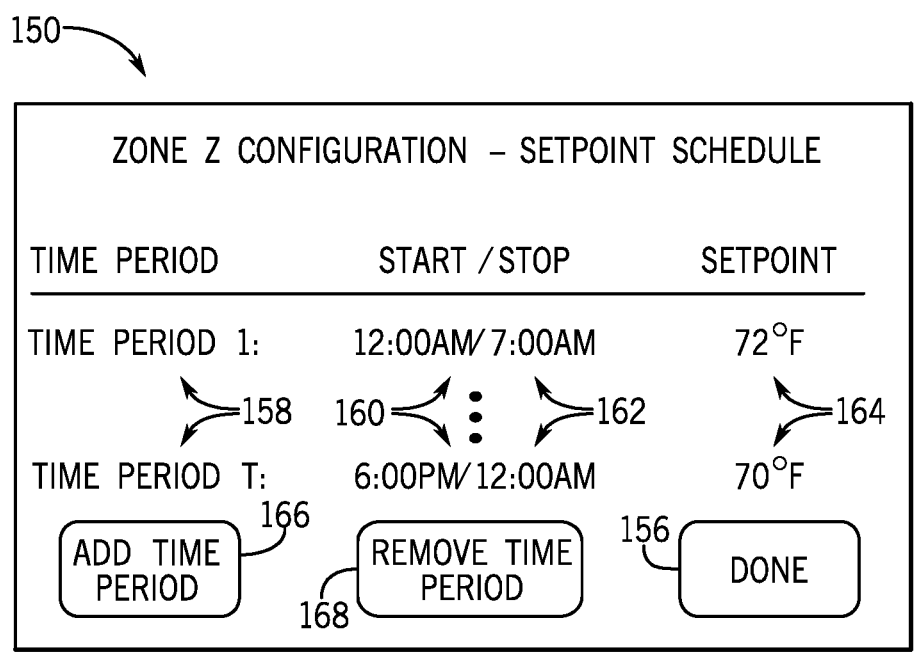
FIG. 10 is an example of a scheduled setpoint configuration graphical user interface (GUI) including a prompt to enter or select a start time, a stop time, and an air condition setpoint to be associated with one or more time periods of an air condition schedule associated with a building zone, in accordance with an embodiment of the present disclosure.
Figure 11:
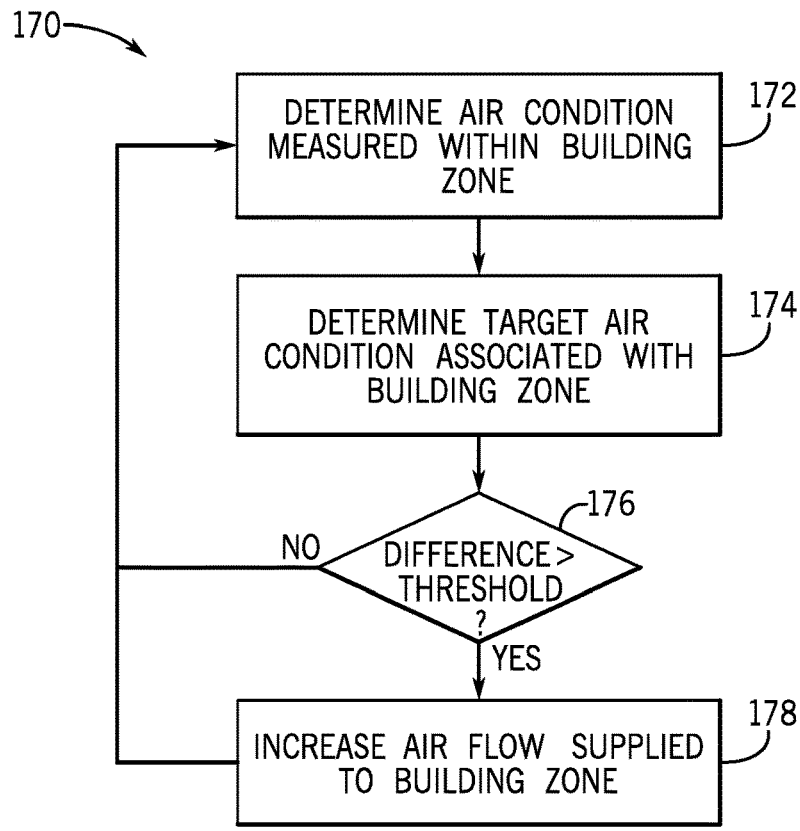
FIG. 11 is a flow diagram of an example process for operating the zone control system of FIG. 6 to control air conditions within a building zone, in accordance with an embodiment of the present disclosure.

To help illustrate, an example of a constant setpoint configuration graphical user interface (GUI) 148 is shown in FIG. 9 and an example of a setpoint schedule configuration graphical user interface (GUI) 150 is shown in FIG. 10. In particular, the depicted constant setpoint configuration graphical user interface 148 and the depicted setpoint schedule configuration graphical user interface 150 corresponds with a Zth building zone 120. In other words, a control system 100 may instruct the electronic display 106 to display the setpoint schedule configuration graphical user interface 150 when the target setpoint mode of the Zth building zone 120 is the scheduled setpoint mode and instruct the electronic display 106 to display the constant setpoint configuration graphical user interface 148 when the target setpoint mode of the Zth building zone 120 is the constant setpoint mode As in the example depicted in FIG. 9, a constant setpoint configuration graphical user interface 148 may include a visual representation 152 of a constant air condition setpoint to be associated with a Zth building zone 120. In some embodiments, when not previously set by a user (e.g., during initial setup configuration process), the value of the constant air condition setpoint may be a default value, for example, pre-determined and stored in memory 88 of a thermostat control device 16B by a manufacturer, a system integrator, or a service technician. Additionally or alternatively, the visual representation 152 of the constant air condition setpoint value may be blank upon initial display of the constant setpoint configuration graphical user interface 148, thereby prompting a user, such as a service technician or a homeowner, to set the constant air condition setpoint.

In some embodiments, a control system 100 may enable a user, such as a homeowner or a service technician, to set and/or adjust value of one or more constant air condition setpoints to be associated with a building zone 120 from a corresponding constant setpoint configuration graphical user interface 148. For example, in response to a user input selecting the visual representation 138 of the constant air condition setpoint, the control system 100 may set the value of the constant air condition setpoint based at least in part on subsequently received user inputs. In some embodiments, the control system 100 may enable user inputs to select a constant air condition setpoint from multiple pre-determined options. Additionally or alternatively, the control system 100 may enable user inputs to explicitly indicate the constant air condition setpoint.

To facilitate improving user configuration, in some embodiments, the control system 100 may adaptively adjust the visual representation 152 of the constant air condition setpoint in response to a user input that requests a change to the value of the constant air condition setpoint. For example, in response to a user input that requests increase of the constant air condition setpoint, the constant setpoint configuration graphical user interface 148 may adaptively adjust the visual representation 152 of the constant air condition setpoint to indicate 76° F. On the other hand, in response to a user input that requests decrease of the constant air condition setpoint, the constant setpoint configuration graphical user interface 148 may adaptively adjust the visual representation 152 of the constant air condition setpoint to indicate 74° F.

Additionally, in some embodiments, a control system 100 may wait to associate parameters, such as a setpoint mode and/or an air condition setpoint, with a building zone 120 until after a user input confirming the constant air condition setpoint is received. For example, the constant setpoint configuration graphical user interface 148 may include a DONE soft button 156. In such embodiments, once a user input selecting the DONE soft button 156 is received, the control system 100 may associate the value of the constant air condition setpoint indicated by the visual representation 152 with the Zth building zone 120, for example, by storing the value of the constant air condition setpoint as well as a setpoint mode indicator identifying the constant setpoint mode at memory addresses in memory 88 allocated for the Zth building zone 120. In this manner, a constant setpoint configuration graphical user interface 148 may facilitate user configuration of a constant air condition setpoint to be associated with a building zone 120, for example, by enabling a user to setup and/or subsequently adjust a target air condition merely by programming a single air condition setpoint.

Comparatively, as in the example depicted in FIG. 10, a setpoint schedule configuration graphical user interface 150 may include a visual representation of an air condition setpoint schedule to be associated with the Zth building zone 120. For example, the setpoint schedule configuration graphical user interface 150 may include a visual representation 158 of each time period during a control horizon of the air condition setpoint schedule. Additionally, the setpoint schedule configuration graphical user interface 150 may include a visual representation of parameters associated with each time period during the control horizon. For example, for each time period, the setpoint schedule configuration graphical user interface 150 may include a visual representation 160 of the value of a start time parameter, a visual representation 162 of the value of a stop time parameter, and a visual representation 164 of one or more air condition setpoints.

In some embodiments, when not previously set by a user (e.g., during initial setup configuration process), the air condition setpoint schedule may be default air condition setpoint schedule, for example, pre-determined and stored in memory 88 of a thermostat control device 16B by a manufacturer, a system integrator, or a service technician. Additionally or alternatively, the visual representation of the current air condition setpoint schedule may be blank upon initial display of the setpoint schedule configuration graphical user interface 150, thereby prompting a user, such as a service technician or a homeowner, to set the air condition setpoint schedule.

Furthermore, in some embodiments, a control system 100 may enable a user, such as a homeowner or a service technician, to set and/or adjust parameters of the air condition setpoint schedule to be associated with a building zone 120 from a corresponding setpoint schedule configuration graphical user interface 150. In some embodiments, the parameters of an air condition setpoint schedule may include the number of time periods that occur during its control horizon. To facilitate user configuration of the number of time periods, as in the depicted example, the setpoint schedule configuration graphical user interface 150 may include an ADD TIME PERIOD soft button 166 and a REMOVE TIME PERIOD soft button 168. As described above, in some embodiments, functionality of a soft button, such as the ADD TIME PERIOD soft button 166 or the REMOVE TIME PERIOD soft button 168, may additionally or alternatively be implemented via a hard button input device 110.

Moreover, in some embodiments, the control system 100 may enable the user to set and/or adjust parameters of one or more time periods during the air condition setpoint schedule from the setpoint schedule configuration graphical user interface 150. For example, in response to a user input selecting a visual representation 160 of a start time parameter, the control system 100 may set the value of the start time parameter based at least in part on subsequently received user inputs. Similarly, in response to a user input selecting a visual representation 162 of a stop time parameter, the control system 100 may set the value of the start time parameter based at least in part on subsequently received user inputs. Furthermore, in response to a user input selecting a visual representation 164 for an air condition setpoint, the control system 100 may set the value of the air condition setpoint based at least in part on subsequently received user inputs. In some embodiments, the control system 100 may enable user inputs to select the value of a parameter, such as a start time parameter, a stop time parameter, and/or an air condition setpoint, to be associated with a time period during the air condition setpoint schedule from multiple pre-determined options. Additionally or alternatively, the control system 100 may enable user inputs to explicitly indicate the value of the parameter to be associated with the time period.

To facilitate improving user configuration, in some embodiments, the control system 100 may adaptively adjust the visual representation of the air condition setpoint schedule based at least in part on user inputs received during display of the setpoint schedule configuration graphical user interface 150. For example, in response to a user input selecting the ADD TIME PERIOD soft button 166, the setpoint schedule configuration graphical user interface 150 may be updated to include a visual representation 158 of a T+1th time period, a visual representation 160 of a start time parameter associated with the T+1th time period, a visual representation 162 of a stop time parameter associated with the T+1th time period, and a visual representation 164 of an air condition setpoint associated with the T+1th time period.

On the other hand, in response a user input selecting the REMOVE TIME PERIOD soft button 168, the setpoint schedule configuration graphical user interface 150 may be updated to remove the visual representation 158 of the Tth time period, the visual representation 160 of its start time parameter associated with the Tth time period, the visual representation 162 of its stop time parameter associated, and the visual representation 154 of an associated air condition setpoint.

Additionally, in some embodiments, a control system 100 may wait to associate parameters, such as a setpoint mode and/or an air condition setpoint schedule, with a building zone 120 until after a user input confirming the air condition setpoint schedule is received. For example, the setpoint schedule configuration graphical user interface 150 may include a DONE soft button 156. In such embodiments, once a user input selecting the DONE soft button 156 is received, the control system 100 may associate the air condition setpoint schedule with the Zth building zone 120, for example, by storing parameters of the air condition schedule as well as a setpoint mode indicator identifying the schedule setpoint mode at memory addresses in memory 88 allocated for the Zth building zone 120. In this manner, a setpoint schedule configuration graphical user interface 150 may facilitate user configuration of an air condition schedule to be associated with a building zone 120.

As illustrated by the preceding examples, user configuration of an air condition setpoint schedule is generally more complex than user configuration of a constant air condition setpoint. In particular, to setup an air condition setpoint schedule, a user may be prompted to set the number of time periods during the control horizon of the air condition setpoint schedule, a start time parameter for each of the time periods, a stop time parameter for each of the time periods, and an air condition setpoint for each of the time periods. Comparatively, to setup a constant air condition setpoint, a user may merely be prompted to set a single air condition setpoint. In fact, in some embodiments, user configuration of an air condition setpoint schedule with a single time period, which potentially has the same result as a constant air condition setpoint, may still be more complex than user configuration of the constant air condition setpoint, for example, due to the user nevertheless being prompted to set a start time parameter and a stop time parameter for the time period.

As described above, at least in some instances, configuration complexity may affect likelihood of a user customizing air condition setpoints, for example, to facilitate achieving a target occupant comfort level and/or a target power consumption. As such, at least in some instances, enabling a user to select a target setpoint mode for each individual building zone 120 may facilitate reducing complexity of an initial setup configuration process, for example, due to a constant setpoint mode being selected for one or more building zones 120, thereby obviating setup configuration of air condition setpoint schedules for the one or more building zones 120. In this manner, the techniques described in the present disclosure may facilitate improving an initial setup configuration process for an HVAC system, which, at least in some instances, may encourage user customization that facilitates achieving the target occupant comfort level and/or the target power consumption.

After completion of an initial setup configuration process, a control system 100 may control operation of HVAC equipment, such as an HVAC unit 12 and/or a damper assembly 122, to control air flow and, thus, air conditions present within serviced building zones 120. To help illustrate, an example of a process 170 for operating a control system 100 deployed in a zoned HVAC system 11A is described in FIG. 12. Generally, the process 170 includes determining an air condition measured within a building zone (process block 172), determining a target air condition associated with the building zone (process block 174), determining whether difference between the measured air condition and the target air condition is greater than a threshold (decision block 176), and increasing air flow supplied to the building zone when the difference is greater than the threshold (process block 178).

Although described in a particular order, which represents a particular embodiment, it should be noted that the process 170 may be performed in any suitable order. Additionally, embodiments of the process 170 may omit process blocks and/or include additional process blocks. Moreover, in some embodiments, the process 170 may be implemented at least in part by executing instructions stored in a tangible, non-transitory, computer-readable medium, such as memory 88 implemented in a control system 100, using processing circuitry, such as a processor 86 implemented in the control system 100.

Accordingly, in some embodiments, a control system 100 deployed in a zoned HVAC system 11A may determine value of one or more air conditions measured within a building zone 120 (process block 172). As described above, in some embodiments, one or more sensors 99 may be deployed in a building zone 120 to measure value of air conditions present in the building zone 120. Additionally, in some embodiments, the control system 100 more store one or more measured air condition values in memory 88, for example, deployed in a corresponding thermostat control device 16B and/or a zone control device 16C communicatively coupled to the thermostat control device 16B.

The control system 100 may also determine one or more target air condition values associated with the building zone 120 (process block 174). As described above, in some embodiments, a control system 100 may be implemented to simultaneously (e.g., concurrently) support multiple different setpoint modes, for example, which provide varying tradeoffs between configuration complexity and control granularity. For example, the control system 100 may support a scheduled setpoint mode, which when selected for a building zone 120 results in a setpoint schedule being associated with the building zone 120, and a constant setpoint mode, which when selected for a building zone 120 results in a constant air condition setpoint being associated with the building zone. Accordingly, in such embodiments, the control system 100 may determine the value of a target air condition value or an air condition setpoint to be used to control air conditions within the building zone 120 based at least in part on the setpoint mode selected for the building zone 120, for example, due to an air condition setpoint schedule enabling air condition setpoints associated with different time periods during its control horizon to be independently configured.

Figure 13:
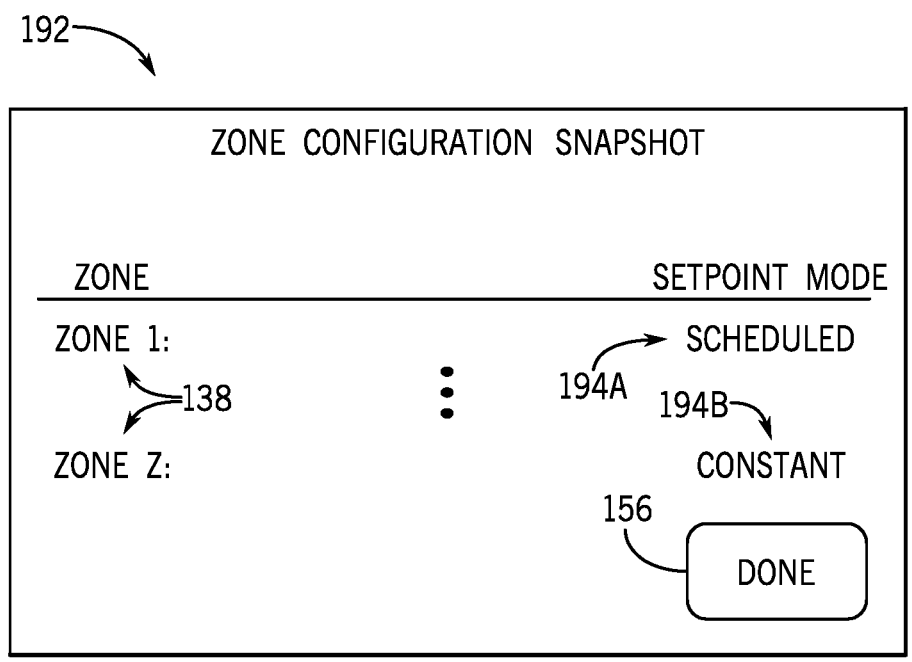
FIG. 13 is an example of a zone configuration snapshot graphical user interface (GUI) identifying a setpoint mode used to indicate one or more air condition setpoints for each building zone, in accordance with an embodiment of the present disclosure.

To help illustrate, an example of a process 180 for determining a current air condition setpoint is described in FIG. 13. Generally, the process 180 includes determining a setpoint mode associated with a building zone (process block 182), determining whether the setpoint mode is a scheduled setpoint mode (decision block 184), and determining a constant air condition setpoint associated with the building zone when the setpoint mode is not the scheduled setpoint mode (process block 186). Additionally, when the setpoint mode is the scheduled setpoint mode, the process 180 includes determining an air condition schedule associated with the building zone (process block 188) and determining an air condition setpoint associated with a current time period in the air condition setpoint schedule (process block 190).

Although described in a particular order, which represents a particular embodiment, it should be noted that the process 180 may be performed in any suitable order. Additionally, embodiments of the process 180 may omit process blocks and/or include additional process blocks. Moreover, in some embodiments, the process 180 may be implemented at least in part by executing instructions stored in a tangible, non-transitory, computer-readable medium, such as memory 88 implemented in a control system 100, using processing circuitry, such as a processor 86 implemented in the control system 100.

Accordingly, in some embodiments, a control system 100 deployed in a zoned HVAC system 11A may determine a setpoint mode associated with a building zone 120 (process block 182). As described above, in some embodiments, memory 88 of a control system 100 may be allocated such that one or more memory addresses are dedicated for indicating parameters associated with each building zone 120. Additionally, as described above, the parameters associated with a building zone 120 may include a setpoint mode indicator that identifies the setpoint mode of the building zone 120.

Thus, to facilitate determining a setpoint mode associated with a building zone 120 in such embodiments, the control system 100 may read parameter data stored at the one or more memory addresses allocated for the building zone 120. In this manner, the control system 100 may determine the setpoint mode of the building zone 120 and, thus, whether the setpoint mode is the schedule setpoint mode based at least in part on a setpoint mode indicator including in the parameter data. For example, when the setpoint mode indicator is a "1-bit," the control system 100 may determine that the setpoint mode of the building zone 120 is the scheduled setpoint mode. On the other hand, when the setpoint mode indicator is a "0-bit," the control system 100 may determine that the setpoint mode of the building zone 120 is the constant setpoint mode and, thus, not the schedule setpoint mode.

When the setpoint mode is not the schedule setpoint mode, the control system 100 may determine a constant air condition setpoint associated with the building zone 120 (process block 186). As described above, in some embodiments, parameter data stored in one or more memory addresses allocated for a building zone 120 may indicate one or more air condition setpoints associated with the building zone 120. Thus, in such embodiments, the control system 100 may determine the constant air condition setpoint associated with the building zone 120 based at least in part on parameter data read from the one or more memory addresses allocated for the building zone 120.

On the other hand, when the setpoint mode is the schedule setpoint mode, the control system 100 may determine an air condition setpoint schedule associated with the building zone (process block 188). As described above, in some embodiments, parameter data stored in one or more memory addresses allocated for a building zone 120 may indicate parameters of an air condition setpoint schedule associated with the building zone 120. Additionally, as described above, the parameters of an air condition setpoint schedule may include a start time for each time period during its control horizon, a stop time for each time period, and one or more air condition setpoints associated with each time period. Thus, in such embodiments, the control system 100 may determine the air condition setpoint schedule associated with the building zone 120 based at least in part on parameter data read from the one or more memory addresses allocated for the building zone 120.

Based on the air condition setpoint schedule, the control system 100 may determine an air condition setpoint associated with a current time (process block 190). In other words, since the air condition setpoint schedule may include multiple time periods potentially associated with different air condition setpoints, the control system 100 may determine identify a current time period in the control horizon of the air condition setpoint schedule. For example, the control system 100 may identify a time period that has a start time occurring before the current time and a stop time occurring after the current time as the current time period. Additionally, the control system 100 may determine a target air condition associated with the building zone 120 based on a corresponding air condition setpoint associated with the current time period in the air condition setpoint schedule.

Figure 12:
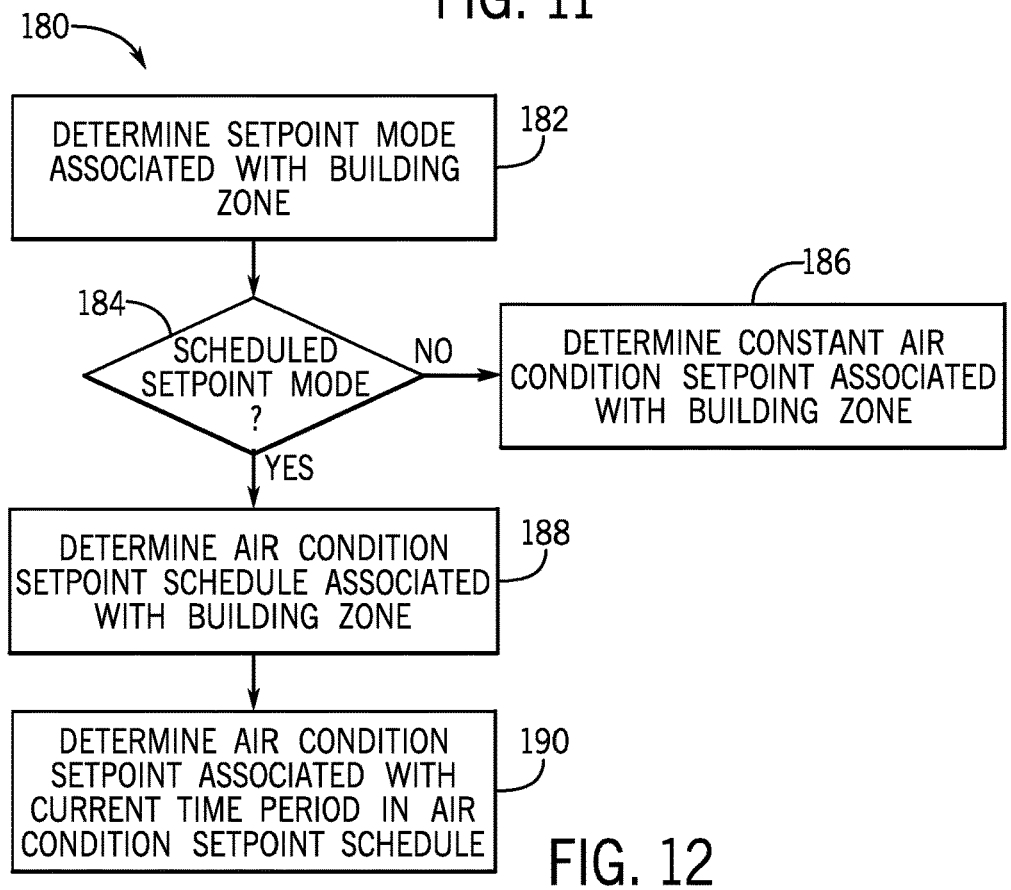
FIG. 12 is a flow diagram of an example process for determining a target air condition associated with a building zone, in accordance with an embodiment of the present disclosure.

Returning to the process 170 of FIG. 12, the control system 100 may then determine whether a difference between the measured air condition and the target air condition is greater than a difference threshold (decision block 176). Additionally, when the difference is greater than the difference threshold, the control system 100 may increase the air flow supplied to the building zone 120 (process block 178). For example, when the difference is greater than the difference threshold, the control system 100 may instruct an HVAC unit 12 to turn on, thereby producing conditioned air that may be supplied to the building zone 120 to facilitate reducing deviation from the target air condition. Additionally or alternatively, to facilitate reducing deviation from the target air condition, the control system 100 may instruct a corresponding damper assembly 122 to transition to a more open position, thereby enabling an increase in conditioned air supplied to the building zone 120. In this manner, a control system 100 may control operation of HVAC equipment to control air flow and, thus, air conditions present within serviced building zones 120, for example, after completion of an initial setup configuration process.

As described above, the techniques described in the present disclosure may additionally or alternatively be applied to facilitate improving a subsequent configuration adjustment process, for example, performed after completion of the initial setup configuration process. To facilitate configuration adjustment, in some embodiments, a control system 100 may display a zone configuration snapshot graphical user interface (GUI), which provides a visual representation of one or more parameters currently associated with each of multiple building zones 120. Additionally, in some embodiments, the control system 100 may enable one or more user inputs received during display of the zone configuration snapshot graphical user interface to initiate a configuration adjustment process.

To help illustrate, an example of a zone configuration snapshot graphical user interface (GUI) 192, which may be displayed on an electronic display 106, is shown in FIG. 8. As in the depicted example, a zone configuration snapshot graphical user interface 192 may provide a visual representation of one or more parameters associated with each of multiple building zones 120. For example, for each building zone 120, the zone configuration snapshot graphical user interface 192 may include a visual representation 138 a corresponding zone name parameter.

Additionally, for each building zone 120, the zone configuration snapshot graphical user interface 192 may include a visual representation 194 of its current setpoint mode. In the depicted example, a first visual representation 194A indicates that the current setpoint mode of the first building zone 120A is the scheduled setpoint mode. Additionally, a second visual representation 194B indicates that the current setpoint mode of the Zth building zone 120 is the constant setpoint mode.

In some embodiments, a control system 100 may enable a user, such as a homeowner or a service technician, to adjust the value of one or more parameters associated with the building zones 120 from the zone configuration snapshot graphical user interface 192. For example, in response to a user input selecting the first visual representation 194A, the control system 100 may change the setpoint mode of the first building zone 120A from the scheduled setpoint mode to the constant setpoint mode. On the other hand, in response to a user input selecting the second visual representation 194B, the control system 100 may change the setpoint mode of the Zth building zone 120 from the constant setpoint mode to the scheduled setpoint mode.

When a setpoint mode of a building zone 120 is changed, in some embodiments, the control system 100 may automatically enable the user to set and/or adjust one or more air condition setpoints to be associated with the building zone 120. For example, when a building zone 120 is changed to the constant setpoint mode, the control system 100 may automatically display a corresponding constant setpoint configuration graphical user interface (GUI) 148 that enables the user to set and/or adjust a constant air condition setpoint to be associated with the building zone 120. On the other hand, when a building zone 120 is changed to the scheduled setpoint mode, the control system 100 may automatically display a corresponding setpoint schedule configuration graphical user interface (GUI) 150 that enables the user to set and/or adjust parameters of an air condition setpoint schedule, such as the number of time periods during the air condition setpoint schedule, an air condition setpoint associated with a time period, the start time of a time period, and/or the stop time of a time period, to be associated with the building zone 120.

As described above, user configuration of an air condition setpoint schedule is generally more complex than user configuration of a constant air condition setpoint. Additionally, at least in some instances, configuration complexity may affect likelihood of a user customizing air condition setpoints, for example, to facilitate achieving a target occupant comfort level and/or a target power consumption. As such, at least in some instances, enabling a user to individually change a target setpoint mode for each of multiple building zone 120 may facilitate reducing complexity of a configuration adjustment process, for example, performed after completion of an initial setup configuration process due to one or more building zones 120 being changed to a constant setpoint mode, thereby obviating configuration of air condition setpoint schedules for the one or more building zones 120. In this manner, the techniques described in the present disclosure may facilitate improving a configuration process, such as an initial setup configuration process and/or a subsequent configuration adjust process, of an HVAC system, which, at least in some instances, may encourage user customization that facilitates achieving the target occupant comfort level and/or the target power consumption.

The specific embodiments described above have been shown by way of example. It should be understood that these embodiments may be susceptible to various modifications and/or alternative forms. It should be further understood that the claims are not intended to be limited to the particular forms disclosed, but rather to cover all modifications, equivalents, and alternatives falling within the spirit and scope of the present disclosure.

What is claimed is:

1. A control system of a heating, ventilation, and air conditioning (HVAC) system, comprising:
control circuitry;
memory configured to store instructions that, when executed by the control circuitry, causes the control circuitry to concurrently:
control air flow supplied to a first building zone by the HVAC system, via a first air damper associated with the first building zone, based on a temperature setpoint schedule associated with the first building zone; and
control air flow supplied to a second building zone by the HVAC system, via a second air damper associated with the second building zone, based on a constant temperature setpoint associated with the second building zone; and
an electronic display configured to display a snapshot graphical user interface comprising:
a first visual representation of a first setpoint mode currently associated with the first building zone; and
a second visual representation of a second setpoint mode currently associated with the second building zone.

2. The control system of claim 1, wherein:
the temperature setpoint schedule associated with the first building zone comprises a time period spanning from a start time to a stop time and associated with a temperature setpoint; and
the constant temperature setpoint associated with the second building zone does not have a pre-defined stop time.

3. The control system of claim 2, wherein:
the time period comprises a first time period spanning from a first start time to a first stop time and associated with a first temperature setpoint;
the temperature setpoint schedule comprises a second time period spanning from a second start time to a second stop time and associated with a second temperature setpoint; and the control circuitry is configured to:
control air flow supplied to the first building zone by the HVAC system during the first time period based on the first temperature setpoint associated with the first time period;
control air flow supplied to the first building zone by the HVAC system during the second time period based on the second temperature setpoint associated with the second time period; and
control air flow supplied to the second building zone by the HVAC system based on the constant temperature setpoint associated with the second building zone during at least the first time period and the second time period.

4. The control system of claim 1, wherein the first building zone is associated with a scheduled setpoint mode while the second building zone is concurrently associated with a constant setpoint mode.

5. The control system of claim 1, comprising:
a first thermostat configured to determine a first temperature measured in the first building zone, wherein the control circuitry is configured to control air flow supplied to the first building zone based on deviation of the first temperature relative to a temperature setpoint included in the temperature setpoint schedule; and
a second thermostat configured to determine a second temperature measured in the second building zone, wherein the control circuitry is configured to control air flow supplied to the second building zone based on deviation of the second temperature relative to the constant temperature setpoint.

6. The control system of claim 1, comprising a zone control panel configured to:
control air flow supplied to the first building zone by controlling damper position of the first air damper fluidly coupled to the first building zone; and
control air flow supplied to the second building zone by controlling damper position of the second air damper fluidly coupled to the second building zone.

7. The control system of claim 1, wherein the electronic display is configured to:
display a configuration setup graphical user interface corresponding with the first building zone that prompts user selection of a target setpoint mode to be associated with the first building zone; and
in response to a user input indicating that the target setpoint mode is a scheduled setpoint mode, display a setpoint schedule configuration graphical user interface that prompts user setting of a number of time periods during a control horizon of the temperature setpoint schedule, a start time of each of the number of time periods, a stop time of each of the number of time periods, and a temperature setpoint associated with each of the number of time periods.

8. The control system of claim 7, wherein the electronic display is configured to:
display another configuration setup graphical user interface corresponding with the second building zone that prompts user selection of another target setpoint mode to be associated with the second building zone; and
in response to another user input indicating that the other target setpoint mode is not the scheduled setpoint mode, display a constant setpoint configuration graphical user interface that prompts user setting of the constant temperature setpoint.

9. The control system of claim 1, wherein:
the control circuitry is configured to:
in response to user selection of the first visual representation of the first setpoint mode, switch the first building zone from a scheduled setpoint mode to a constant setpoint mode; and
in response to user selection of the second visual representation of the second setpoint mode, switch the second building zone from the constant setpoint mode to the scheduled setpoint mode.

10. The control system of claim 9, wherein the electronic display is configured to:
in response to the first building zone being switched from the scheduled setpoint mode to the constant setpoint mode, display a constant setpoint configuration graphical user interface that prompts user setting of another constant temperature setpoint to be associated with the first building zone; and
in response to the second building zone being switched from the constant setpoint mode to the scheduled setpoint mode, display a setpoint schedule configuration graphical user interface that prompts user setting of a number of time periods during a control horizon of another temperature setpoint schedule to be associated with the second building zone, a start time of each of the number of time periods, a stop time of each of the number of time periods, and a temperature setpoint associated with each of the number of time periods.

11. A method of operating a heating, ventilation, and air conditioning (HVAC) system, comprising:
determining, using control circuitry, a constant air condition setpoint associated with a first building zone;
determining, using the control circuitry, an air condition setpoint schedule associated with a second building zone, wherein the air condition setpoint schedule comprises one or more time periods each associated with a start time, a stop time, and an air condition setpoint;
determining, using the control circuitry, a current air condition setpoint associated with the second building zone based on the air condition setpoint associated with a current time period of the air condition setpoint schedule;
simultaneously controlling, using the control circuitry, air flow supplied to the first building zone via control of a first air damper and supplied to the second building zone via control of a second air damper during the current time period based on the constant air condition setpoint associated with the first building zone and the current air condition setpoint associated with the second building zone; and
instructing, using the control circuitry, an electronic display to display a snapshot graphical user interface comprising a first visual representation of a first setpoint mode currently associated with the first building zone and a second visual representation of a second setpoint mode currently associated with the second building zone.

12. The method of claim 11, comprising:
determining, using the control circuitry, another air condition setpoint associated with the second building zone based on the air condition setpoint associated with another time period of the air condition setpoint schedule; and
simultaneously controlling, using the control circuitry, air flow supplied to the first building zone and the second building zone during the other time period based on the constant air condition setpoint associated with the first building zone and the other air condition setpoint associated with the second building zone.

13. The method of claim 11, comprising:
in response to user selection of the first visual representation, switching, using the control circuitry, the first building zone from a constant setpoint mode to a scheduled setpoint mode; and
in response to user selection of the second visual representation, switching, using the control circuitry, the second building zone from the scheduled setpoint mode to the constant setpoint mode.

14. The method of claim 13, comprising:
in response to the first building zone being switched to the scheduled setpoint mode, instructing, using the control circuitry, the electronic display to display a setpoint schedule configuration graphical user interface that enables user configuration of another air condition setpoint schedule to be associated with the first building zone; and
in response to the second building zone being switched to the constant setpoint mode, instructing, using the control circuitry, the electronic display to display a constant setpoint configuration graphical user interface that enables user configuration of another constant air condition setpoint to be associated with the second building zone.

15. The method of claim 11, comprising:
determining, using the control circuitry, a first air condition measured in the first building zone; and
determining, using the control circuitry, a second air condition measured in the second building zone;
wherein controlling air flow supplied to the first building zone and the second building zone during the current time period comprises:
instructing an HVAC unit to turn on when the first air condition measured in the first building zone deviates from the constant air condition setpoint associated with the first building zone by more than a threshold, when the second air condition measured in the second building zone deviates from the current air condition setpoint associated with the second building zone by more than the threshold, or both;
causing the first air damper fluidly coupled to the first building zone to transition to a first more open position when the first air condition measured in the first building zone deviates from the constant air condition setpoint associated with the first building zone by more than the threshold; and
causing the second air damper fluidly coupled to the second building zone to transition to a second more open position when the second air condition measured in the second building zone deviates from the current air condition setpoint associated with the second building zone by more than the threshold.

16. The method of claim 11, comprising:
determining, using the control circuitry, a current time;
determining, using the control circuitry, the start time and the stop time of each of the one or more time periods of the air condition setpoint schedule; and
identifying, using the control circuitry, the current time period such that the start time of the current time period occurs before the current time and the stop time of the current time period occurs after the current time.

17. A control system configured to be deployed in a heating, ventilation, and air conditioning (HVAC) system, comprising:
memory configured to store a constant air condition setpoint associated with a building zone, an air condition setpoint schedule associated with the building zone, an additional constant air condition setpoint associated with an additional building zone, and an additional air condition setpoint schedule associated with the additional building zone;
control circuitry configured to:
determine a setpoint mode currently associated with the building zone;
determine an additional setpoint mode currently associated with the additional building zone; and
simultaneously control air flow supplied to the building zone via control of an air damper associated with the building zone based on the constant air condition setpoint when the setpoint mode currently associated with the building zone is a constant setpoint mode and control air flow supplied to the additional building zone via control of an additional air damper based on the additional air condition setpoint schedule when the additional setpoint mode currently associated with the additional building zone is a scheduled setpoint mode; and
an electronic display configured to display a snapshot graphical user interface comprising:
a first visual representation of the setpoint mode currently associated with the building zone; and a second visual representation of the additional setpoint mode currently associated with the additional building zone.

18. The control system of claim 17, wherein the memory is configured to:
store a first setpoint mode indicator that identifies the setpoint mode currently associated with the building zone; and
store a second setpoint mode indicator that identifies the additional setpoint mode currently associated with the additional building zone.

19. The control system of claim 17, wherein the control circuitry is configured to toggle the setpoint mode currently associated with the building zone between the constant setpoint mode and the scheduled setpoint mode in response to a user input selecting the first visual representation of the setpoint mode currently associated with the building zone.

20. The control system of claim 19, wherein the electronic display is configured to:
display a third visual representation of the constant air condition setpoint in response to the setpoint mode currently associated with the building zone being toggled from the scheduled setpoint mode to the constant setpoint mode; and
display a fourth visual representation of the air condition setpoint schedule in response to the setpoint mode currently associated with the building zone being toggled from the constant setpoint mode to the scheduled setpoint mode.

21. The control system of claim 19, wherein the air condition setpoint schedule comprises a finite control horizon and an air condition setpoint variable over the finite control horizon.

* * * * *